(12) United States Patent
Nakaya et al.

(10) Patent No.: US 12,533,803 B2
(45) Date of Patent: Jan. 27, 2026

(54) ROBOT CONTROLLING DEVICE, ROBOT SYSTEM AND METHOD OF CONTROLLING ROBOT

(71) Applicant: KAWASAKI JUKOGYO KABUSHIKI KAISHA, Kobe (JP)

(72) Inventors: Atsushi Nakaya, Akashi (JP); Shinya Kitano, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 955 days.

(21) Appl. No.: 17/282,147

(22) PCT Filed: Dec. 24, 2019

(86) PCT No.: PCT/JP2019/050458
§ 371 (c)(1),
(2) Date: Apr. 1, 2021

(87) PCT Pub. No.: WO2020/138017
PCT Pub. Date: Jul. 2, 2020

(65) Prior Publication Data
US 2021/0354293 A1    Nov. 18, 2021

(30) Foreign Application Priority Data
Dec. 28, 2018  (JP) .................................. 2018-248076

(51) Int. Cl.
*B25J 9/16*  (2006.01)
*B25J 9/04*  (2006.01)
*B25J 9/10*  (2006.01)

(52) U.S. Cl.
CPC .............. *B25J 9/1651* (2013.01); *B25J 9/042* (2013.01); *B25J 9/106* (2013.01); *B25J 9/1612* (2013.01)

(58) Field of Classification Search
CPC . B25J 9/1651; B25J 9/042; B25J 9/106; B25J 9/1612; B25J 9/1664; B25J 9/126;
(Continued)

(56) References Cited

U.S. PATENT DOCUMENTS

2005/0201424 A1* 9/2005 Yoshida .................. G01S 17/42
2011/0118873 A1* 5/2011 Hashimoto ............ B25J 9/1692
(Continued)

FOREIGN PATENT DOCUMENTS

| JP | 2003-145461 A | 5/2003 |
| JP | 2009-113172 A | 5/2009 |
| KR | 20020079469 A | * 10/2002 |

OTHER PUBLICATIONS

Machine Translation of JP-2003145461-A (Year: 2003).*

*Primary Examiner* — Ramon A. Mercado
*Assistant Examiner* — Ellis B. Ramirez
(74) *Attorney, Agent, or Firm* — Oliff PLC

(57) ABSTRACT

A robot controlling device capable of preventing a rapid change in posture of a robotic arm due to a singular point. The robot controlling device brings a third rotational axis to on a circumference of a circle which is on a first rotational axis with a radius at a difference between a distance from the first rotational axis to a second rotational axis and a distance from the second rotational axis to the third rotational axis while changing posture of a horizontal robot to be holdable of a workpiece in an accommodating device, and moves the third rotational axis across a line connecting the first rotational axis and the second rotational axis, and moves the second rotational axis and the third rotational axis divided at the second straight line, connecting a center point of the workpiece accommodated in the accommodating device and the first rotational axis.

14 Claims, 13 Drawing Sheets

(58) Field of Classification Search
CPC .... B25J 9/1674; B25J 15/022; B25J 15/0246; G05B 2219/45031; G05B 19/18; H01L 21/677
USPC ............ 700/252, 245; 414/1; 901/14, 15, 16
See application file for complete search history.

(56) References Cited

U.S. PATENT DOCUMENTS

| | | | |
|---|---|---|---|
| 2011/0135437 A1* | 6/2011 | Takeshita | H01L 21/67742 |
| 2013/0338827 A1* | 12/2013 | One | G05B 19/423 |
| 2014/0297031 A1* | 10/2014 | Iwasaki | B25J 9/1664 |
| | | | 700/245 |
| 2015/0224644 A1* | 8/2015 | Gomi | B25J 9/1694 |
| 2016/0229051 A1* | 8/2016 | Edelmann | B25J 9/0021 |
| 2016/0318182 A1* | 11/2016 | Nakaya | B25J 9/1697 |
| 2017/0312915 A1* | 11/2017 | Kuribayashi | B25J 9/043 |
| 2018/0015620 A1* | 1/2018 | Nakaya | B25J 19/063 |
| 2019/0275679 A1* | 9/2019 | Kuroda | A61B 34/30 |
| 2019/0299416 A1* | 10/2019 | Watanabe | B25J 9/046 |

* cited by examiner

ROBOT CONTROLLING DEVICE, ROBOT SYSTEM AND METHOD OF CONTROLLING ROBOT

TECHNICAL FIELD

The present disclosure relates to a robot controlling device, a robot system, and a method of controlling a robot.

BACKGROUND ART

Conventionally, it is known that a robot controlling device controls operation of a horizontally articulated robot which performs work to a workpiece accommodated in an accommodating device. Patent Document 1 discloses a command-value generating device as one example of such a robot controlling device.

One purpose of Patent Document 1 is to provide the command-value generating device which prevents a plurality of joints from moving largely when passing through a vicinity of a singular point, and suppress a deceleration of a tip end of a robotic arm to shorten operating time. In order to achieve this purpose, first, the command-value generating device executes inverse conversions at a start point and an end point of the vicinity area of the singular point. Next, the command-value generating device generates a position of each joint when passing through the vicinity of the singular point by an axial interpolation based on the results of the inverse conversions at the start point and the end point.

REFERENCE DOCUMENT OF CONVENTIONAL ART

Patent Document

[Patent Document 1] JP2009-113172A

DESCRIPTION OF THE DISCLOSURE

Problem to be Solved by the Disclosure

However, the command-value generating device of Patent Document 1 requires a complicated calculation to create the joint positions when passing through the vicinity of the singular point.

Therefore, one purpose of the present disclosure is to provide a robot controlling device, a robot system, and a method of controlling a robot, capable of easily preventing a rapid change in a posture of a robotic arm due to a singular point.

SUMMARY OF THE DISCLOSURE

In order to solve the problem, a robot controlling device according to one aspect of the present disclosure is configured to control operation of a horizontally articulated robot configured to perform a work to a workpiece accommodated in an accommodating device. The accommodating device includes a placing part on which the workpiece is placed, a wall surface, and an opening. The horizontally articulated robot includes a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis. The horizontally articulated robot is disposed opposing to the opening such that a first straight line passes a vicinity of a circle centering on the first rotational axis with a radius at a difference between a distance from the first rotational axis to the second rotational axis and a distance from the second rotational axis to the third rotational axis, the first straight line being an extended line of a perpendicular from a center point of the workpiece accommodated in the accommodating device to the opening when seen in axial directions of the first to third rotational axes. The robot controlling device includes a memory, and a processor configured to execute a program stored in the memory. When the program stored in the memory is executed by the processor, the robot controlling device brings the third rotational axis to be positioned on a circumference of the circle while changing a posture of the horizontally articulated robot to be holdable of the workpiece accommodated in the accommodating device, and moves the third rotational axis across a second straight line connecting the first rotational axis and the second rotational axis, and then moves each of the second rotational axis and the third rotational axis only in one of two ranges divided at a third straight line, as a boundary, connecting the center point of the workpiece accommodated in the accommodating device and the first rotational axis.

According to this configuration, since after the third rotational axis is positioned on the circumference, the third rotational axis is moved across the second straight line connecting the first rotational axis and the second rotational axis, and then each of the second rotational axis and the third rotational axis is moved only in one of two ranges divided at the third straight line, as a boundary, connecting the center point of the workpiece accommodated in the accommodating device and the first rotational axis, a rapid change in a posture of a robotic arm due to a singular point can easily be prevented.

In order to solve the problem, a robot controlling device according to one aspect of the present disclosure is configured to control operation of a horizontally articulated robot configured to perform a work to a workpiece accommodated in an accommodating device. The accommodating device includes a placing part on which the workpiece is placed, a wall surface, and an opening. The horizontally articulated robot includes a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis. The horizontally articulated robot is disposed opposing to the opening such that, while the robot hand takes out the workpiece accommodated in the accommodating device, or while the robot hand accommodates the workpiece into the accommodating device, an access straight line passes a vicinity of a circle centering on the first rotational axis with a radius at a difference between a distance from the first rotational axis to the second rotational axis and a distance from the second rotational axis to the third rotational axis, the access straight line being a line in parallel with a direction in which the workpiece is linearly moved by the robot hand without being contacted to the wall surface when seen in axial directions of the first to third rotational axes, and passing a center point of the workpiece accommodated in the accommodating device. The robot controlling device includes a memory, and a processor configured to execute a program stored in the memory. When the program stored in the memory is executed by the processor, the robot controlling device brings the third rotational axis to be positioned on a circumference of the circle while changing a posture of the horizontally articulated robot to be holdable of the workpiece accommodated in the accommodating device, and moves the third rotational axis across a second straight line connecting the first rotational axis and the second rotational axis, and then moves each of the second rotational axis and the third rotational axis only in one of two ranges divided at a third straight line, as a boundary, connecting the center point of the workpiece accommodated in the accommodating device and the first rotational axis.

According to this configuration, since after the third rotational axis is positioned on the circumference, the third rotational axis is moved across the second straight line connecting the first rotational axis and the second rotational axis, and then each of the second rotational axis and the third rotational axis is moved only in one of two ranges divided at the third straight line, as a boundary, connecting the center point of the workpiece accommodated in the accommodating device and the first rotational axis, the rapid change in the posture of the robotic arm due to the singular point can easily be prevented.

After the third rotational axis is positioned on the circumference, a range in which the second rotational axis moves may be on the same side as a range in which the third rotational axis moves with respect to the third straight line, when seen in the axial directions.

According to this configuration, the rapid change in the posture of the robotic arm due to the singular point can be prevented more easily.

For example, after the third rotational axis is positioned on the circumference, a range in which the second rotational axis moves may be on the opposite side from a range in which the third rotational axis moves with respect to the third straight line, when seen in the axial directions.

When the program stored in the memory is executed by the processor, the robot hand may be brought to a posture holdable of the workpiece accommodated in the accommodating device while being inclined at a given angle with respect to the first straight line.

According to this configuration, when the robot hand takes the posture holdable of the workpiece accommodated in the accommodating device, a problem that the robot hand contacts the wall surface of the accommodating device since the first rotational axis separates from the first straight line by a given distance, can be solved.

When the program stored in the memory is executed by the processor, the robot hand may be linearly moved in parallel with the first straight line while being inclined at the given angle with respect to the first straight line, at least in a part of a path along which the posture of the horizontally articulated robot is changed from a posture in which the third rotational axis is positioned on the circumference, to a posture holdable of the workpiece accommodated in the accommodating device, when seen in the axial directions, and may be brought to the posture holdable of the workpiece accommodated in the accommodating device.

According to this configuration, the rapid change in the posture of the robotic arm due to the singular point can be prevented more easily.

When the program stored in the memory is executed by the processor, the robot hand may be linearly moved in parallel with the first straight line while being inclined at the given angle with respect to the first straight line over the entire path.

According to this configuration, the rapid change in the posture of the robotic arm due to the singular point can be prevented furthermore easily.

For example, when the program stored in the memory is executed by the processor, and the third rotational axis passes the circumference, or inside or the vicinity of the circle, each of the first to third rotational axes may be operated based on an axial interpolation.

For example, the distance between the first rotational axis and the second rotational axis may be the same as the distance between the second rotational axis and the third rotational axis, and the radius of the circle may be zero.

In order to solve the problem, a robot system according to the present disclosure includes any one of the robot controlling devices, the horizontally articulated robot of which operation is controlled by the robot controlling device, and the accommodating device configured to accommodate the workpiece to which the horizontally articulated robot performs the work.

According to this configuration, any one of the robot controlling devices described above is provided, and thus, the rapid change in the posture of the robotic arm due to the singular point can be prevented easily.

In order to solve the problem, a control method according to one aspect of the present disclosure is a method of controlling a horizontally articulated robot, in which a placing part on which a workpiece is placed, and the horizontally articulated robot provided with a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis are prepared in advance. The placing part and the horizontally articulated robot are disposed such that, while the robot hand holds the workpiece placed on the placing part, or while the robot hand places the workpiece on the placing part, an access straight line does not coincide with a third straight line connecting a center point of the workpiece placed on the placing part and the first rotational axis, the access straight line being a line in parallel with a direction in which the workpiece is linearly moved by the robot hand when seen in axial directions of the first to third rotational axes, and passing the center point of the workpiece placed on the placing part. The method includes the steps of bringing, during the holding operation or the placing operation, the third rotational axis to be positioned on a circumference of a circle centering on the first rotational axis with a radius at a difference between a distance from the first rotational axis to the second rotational axis and a distance from the second rotational axis to the third rotational axis, and moving the third rotational axis across a second straight line connecting the first rotational axis and the second rotational axis (First Step), and moving, after the First Step, each of the second and third rotational axes in one of two ranges divided at the third straight line as a boundary (Second Step).

According to this configuration, since after the third rotational axis is positioned on the circumference, the third rotational axis is moved across the second straight line connecting the first rotational axis and the second rotational axis, and then each of the second rotational axis and the third rotational axis is moved only in one of two ranges divided at the third straight line, as a boundary, connecting the center point of the workpiece placed on the placing part and the first rotational axis, the rapid change in the posture of the robotic arm due to the singular point can easily be prevented.

For example, the placing part may be a part of an accommodating device configured to accommodate the workpiece, the accommodating device including a wall surface and an opening. The access straight line may vertically intersect with at least a part of the opening when seen in the axial directions of the first to third rotational axes.

For example, the placing part may be a part of an accommodating device configured to accommodate the workpiece, the accommodating device including a wall surface and an opening. The access straight line may be in parallel with at least a part of the wall surface when seen in the axial directions of the first to third rotational axes.

Effect of the Disclosure

According to the present disclosure, the robot controlling device, the robot system, and the method of controlling the robot can be provided, which are capable of easily preventing a rapid change in a posture of a robotic arm due to a singular point.

BRIEF DESCRIPTION OF DRAWINGS

FIG. 1(A) is a view in which a third rotational axis is located on a farther side from the center point of a workpiece than a first rotational axis, and FIG. 1(B) is a view in which the third rotational axis is located on a closer side to the center point of the workpiece than the first rotational axis.

FIG. 3(A) is a view in which the third rotational axis is coaxial with the first rotational axis, and FIG. 3(B) is a view in which a second rotational axis and the third rotational axis are then moved on the same side of a second straight line.

FIG. 5(A) is a view in which the third rotational axis is coaxial with the first rotational axis, and FIG. 5(B) is a view in which the second and third rotational axes are then moved on opposite sides from each other with respect to the second straight line.

FIG. 7(A) is a view in which the third rotational axis is coaxial with the first rotational axis, and FIG. 7(B) is a view in which a robot hand is in a posture holdable of the workpiece accommodated in an accommodating device, while the robot hand is inclined at a given angle with respect to a first straight line.

FIG. 8(A) is a plan view illustrating the entire configuration of the robot system, and FIG. 8(B) is an enlarged plan view illustrating the accommodating device which accommodates the workpiece, and its peripheral part.

FIG. 9(A) is a view in which the third rotational axis is located on the farther side from the center point of the workpiece than the first rotational axis, and FIG. 9(B) is a view in which the third rotational axis is coaxial with the first rotational axis.

FIG. 10(A) is a view where the third rotational axis is positioned on a circumference when seen in the axial direction, and FIG. 10(B) is a view in which the second and third rotational axes are then moved on the same side of the second straight line.

MODES FOR CARRYING OUT THE DISCLOSURE

Figure 1:
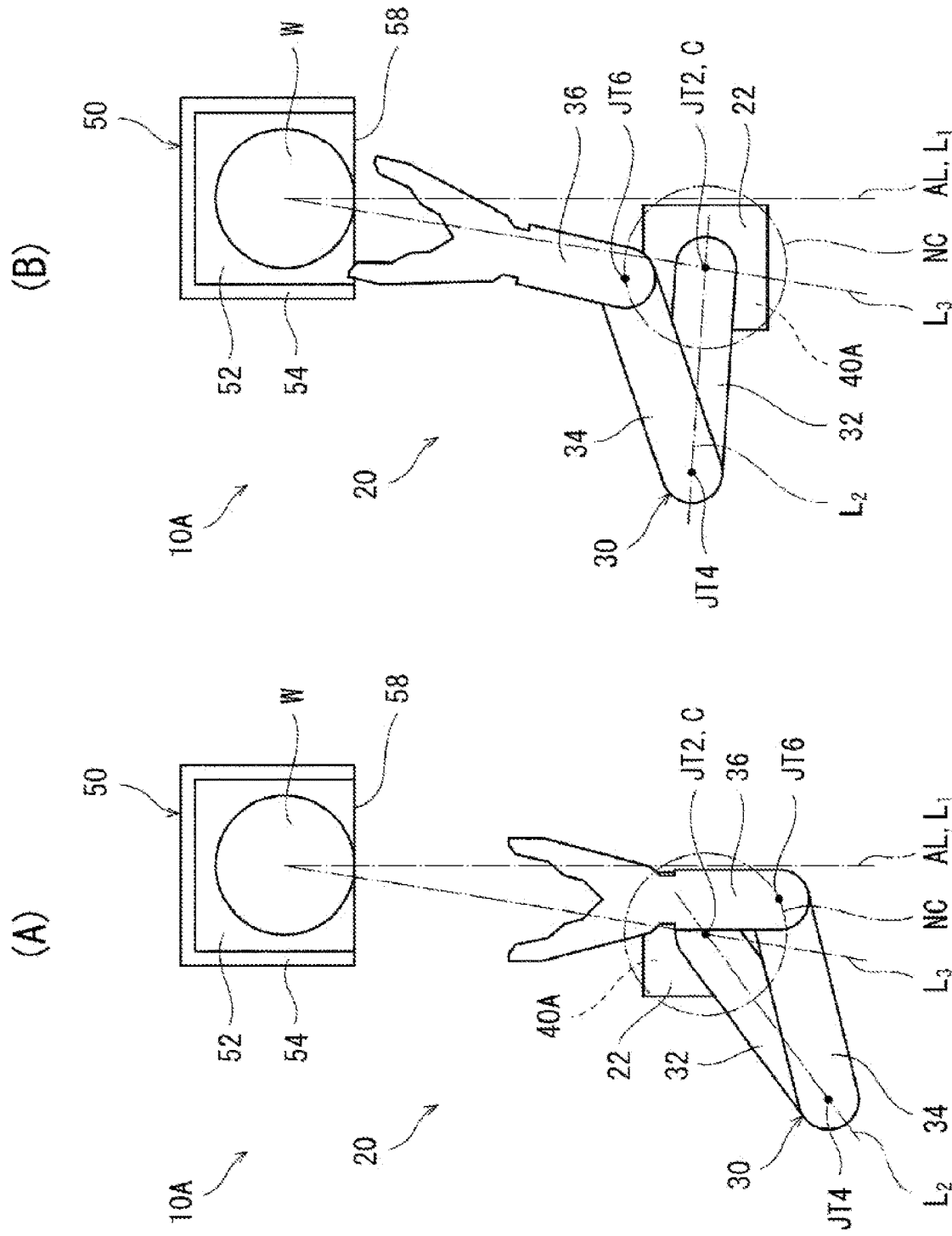
FIGS. 1(A) and 1(B) are schematic views illustrating the entire configuration of a robot system according to one embodiment of the present disclosure, where

Hereinafter, a robot controlling device, a robot system, and a method of controlling a robot according to one embodiment of the present disclosure are described with reference to the accompanying drawings. Note that the present disclosure is not limited to this embodiment. Moreover, below, the same reference characters are given to the same or corresponding elements throughout the drawings to omit redundant description.

(Robot System 10A)

Figure 2:
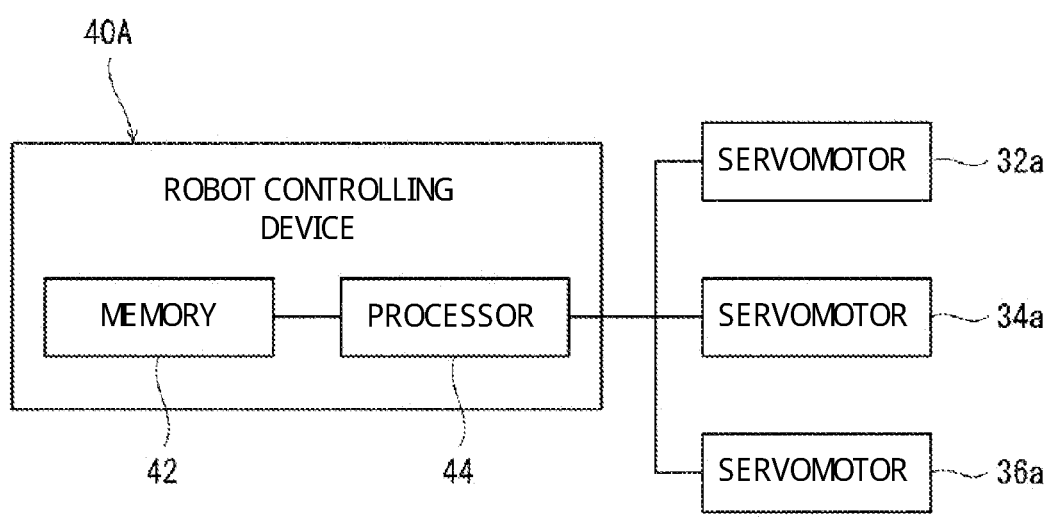
FIG. 2 is a block diagram schematically illustrating a control system of the robot system according to this embodiment of the present disclosure.

FIGS. 1(A) and 1(B) are schematic views illustrating the entire configuration of the robot system according to this embodiment, where FIG. 1(A) is a view in which a third rotational axis is located on a farther side from the center point of a workpiece than first rotational axis, and FIG. 1(B) is a view in which the third rotational axis is located on a closer side to the center point of the workpiece than the first rotational axis. FIG. 2 is a block diagram schematically illustrating a control system of the robot system.

As illustrated in FIGS. 1(A) and 1(B), a robot system 10A according to this embodiment performs work to a workpiece W accommodated in an accommodating device 50, using a horizontally articulated robot 20. The robot system 10A is provided with the horizontally articulated robot 20, the accommodating device 50 which accommodates the workpiece W, and a robot controlling device 40A accommodated inside a pedestal 22 of the horizontally articulated robot 20. Note that the work performed to the workpiece W includes unloading and loading of the workpiece W from and into the accommodating device 50.

(Horizontally Articulated Robot 20)

The horizontally articulated robot 20 is provided with the pedestal 22, an ascendable shaft (not illustrated) provided to the pedestal 22 so as to be vertically expandable and contractible, and a robotic arm 30 attached to an upper-end part of the ascendable shaft. The ascendable shaft provided to the pedestal 22 is configured to be expandable and contractible by a ball screw, etc. (not illustrated). The robotic arm 30 includes a first link 32 and a second link 34 each comprised of an elongated member extending horizontally.

The first link 32 is attached, at its base-end part in a longitudinal direction, to the upper-end part of the ascendable shaft via a rotational axis JT2 (a first rotational axis) driven by a servomotor 32a (see FIG. 2). Thus, the first link 32 is attached to the ascendable shaft while being rotatable about a vertical axial line.

The second link 34 is attached, at its base-end part in the longitudinal direction, to a tip-end part of the first link 32 via a rotational axis JT4 (a second rotational axis) driven by a servomotor 34a (see FIG. 2). Thus, the second link 34 is attached to the first link 32 while being rotatable about a vertical axial line.

A robot hand 36 is attached, at its base-end part in the longitudinal direction, to a tip-end part of the second link 34 via a rotational axis JT6 (a third rotational axis) driven by a servomotor 36a (see FIG. 2). Thus, the robot hand 36 is attached to the second link 34 while being rotatable about a vertical axial line.

The robot hand 36 has a base part including the rotational axis JT6, and a holding part provided to a tip-end part of the base part. The holding part is branched at its tip-end part into two, thus having a Y-shape when seen in a thickness direction.

The horizontally articulated robot 20 is configured such that a distance between the rotational axis JT2 and the rotational axis JT 4 is the same as a distance between the rotational axis JT4 and the rotational axis JT6. Therefore, the horizontally articulated robot 20 has a singular point when the rotational axis JT6 is positioned on (coaxial with) the rotational axis JT2 (i.e., when the first link 32 overlaps with the second link 34) when seen in the axial direction. Here, the singular point is a point at which angles of a plurality of joints are not uniquely defined even when the angles of the plurality of joints are to be determined based on command values.

Moreover, the horizontally articulated robot 20 is disposed opposing to an opening 58 such that a straight line $L_1$ (a first straight line), which is an extended line of a perpendicular from the center point of the workpiece W accommodated in the accommodating device 50 to the opening 58, passes a vicinity of the rotational axis JT2, and the rotational axis JT6 is movable at least within a given range between the rotational axis JT2 and the center point of the workpiece W accommodated in the accommodating device 50.

Note that in this embodiment an acute angle formed between an access straight line AL and the straight line $L_1$ (in other words, an acute angle formed between the access straight line AL and the perpendicular extended from the center point of the workpiece W to the opening 58) is 0° (i.e., the access straight line AL coincides with the straight line $L_1$). The access straight line AL is, when seen in the axial directions of the rotational axes JT2 to JT6, in parallel with a direction in which the workpiece W is linearly moved without being contacted to a wall surface 54 by the robot hand 36, during the robot hand 36 taking out the workpiece W accommodated in the accommodating device 50, or during the robot hand 36 accommodating the workpiece W into the accommodating device 50, and the access straight line AL passes through the center point of the workpiece W accommodated in the accommodating device 50. Accordingly, this embodiment (and Modifications 1 and 2 described later) is described based on the straight line $L_1$ without referring to the access straight line AL, unless particularly required. Note that the access straight line AL will be described later in detail in Modification 3 with reference to FIGS. 8(A) and 8(B).

Moreover, as described above, in this embodiment, the distance between the rotational axis JT2 and the rotational axis JT4 is the same as the distance between the rotational axis JT4 and the rotational axis JT6. Therefore, in this embodiment (and Modifications 1 to 3 described later), when a circle C is defined so as to have the center at the rotational axis JT2, and a radius at a difference between the distance from the rotational axis JT2 to the rotational axis JT4 and the distance from the rotational axis JT4 to the rotational axis JT6, the radius of the circle C is zero. In other words, in this embodiment (and Modifications 1 to 3), the circle C coincides with the rotational axis JT2. Therefore, this embodiment (and Modifications 1 to 3) is described based on the rotational axis JT2 without referring to the circle C, unless particularly required. Note that the circle C will be described later in detail in Modification 4 (described later) with reference to FIGS. 9(A), 9(B), and 10.

In this embodiment, the horizontally articulated robot 20 is disposed such that the straight line $L_1$ passes the vicinity of the rotational axis JT2. In other words, the straight line $L_1$ does not pass through the rotational axis JT2. That is, the rotational axis JT2 is located a given distance from the straight line $L_1$ within the given range.

In FIGS. 1(A), 1(B), etc., the "vicinity of the rotational axis JT2" indicates inside a neighbouring circle NC centering on the rotational axis JT2 when seen in the axial direction. Note that the vicinity of the rotational axis JT2 is not limited to the case illustrated in FIGS. 1(A), 1(B), etc., but may be arbitrarily set to a given vicinity area. Details will be described later.

(Accommodating Device 50)

The accommodating device 50 is provided with a placing part 52 on which the workpiece W is placed, the wall surface 54 surrounding the placing part 52, and the opening 58 formed in the wall surface 54. The accommodating device 50 may be comprised of, for example, a container in which a plurality of workpieces W can be accommodated while being vertically piled up (e.g., a FOUP: Front Opening Unified Pod), or a device on which one or more workpieces W can be placed (e.g., a load-lock device which switches between a vacuum state and an atmospheric state, an alignment device which aligns the workpiece W, and a processing device which applies resist to the workpiece W, etc.).

(Robot Controlling Device 40A)

The robot controlling device 40A according to this embodiment is connected to the horizontally articulated robot 20 so as to control operation of the horizontally articulated robot 20. As illustrated in FIG. 2, the robot controlling device 40A is provided with a memory 42, and a processor 44 which executes a program stored in the memory. The processor 44 is electrically connected to each of the servomotor 32a of the rotational axis JT2, the servomotor 34a of the rotational axis JT4, and the servomotor 36a of the rotational axis JT6.

(Example of Processing Executed by Robot Controlling Device 40A)

Figure 3:
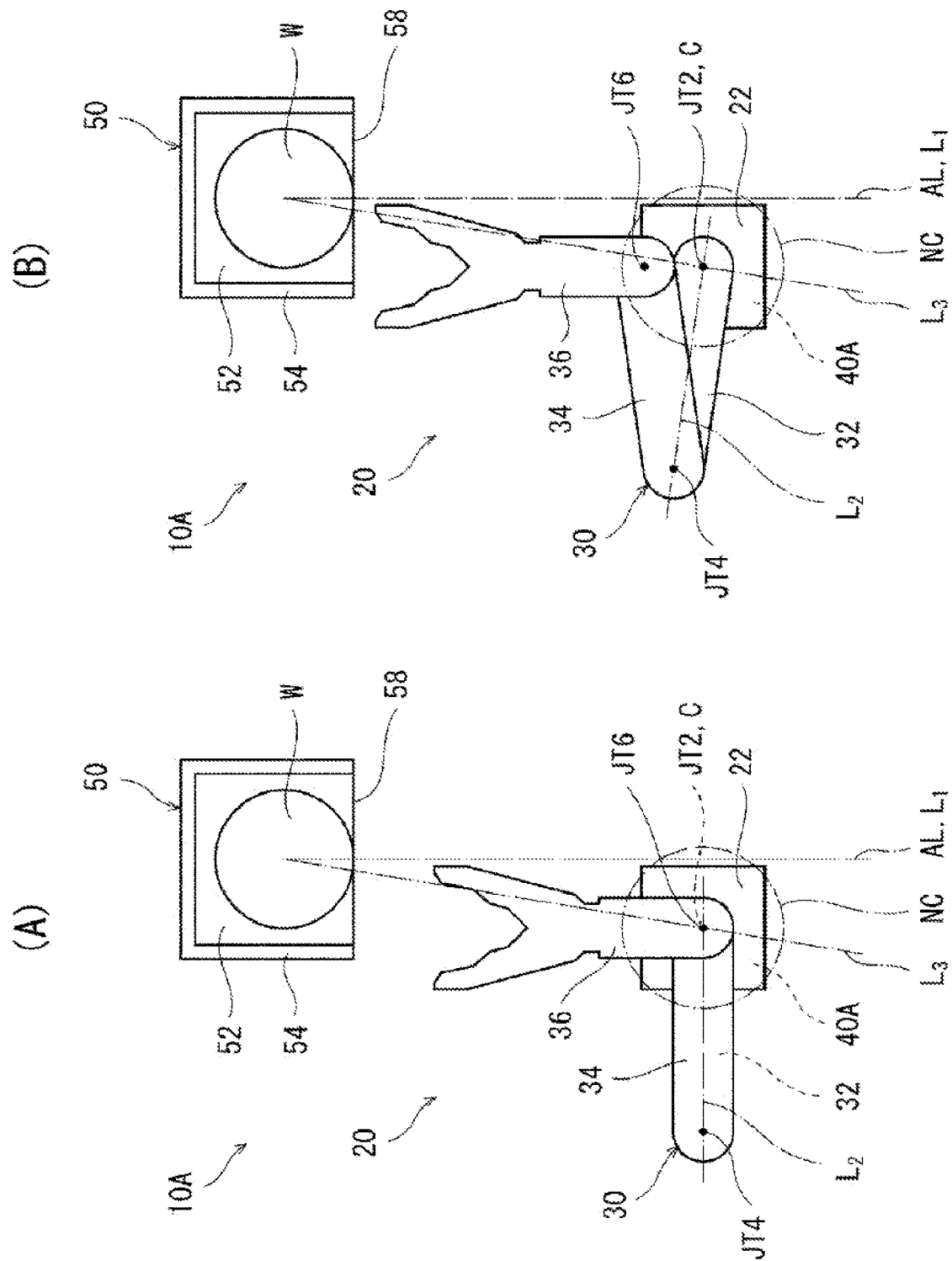
FIGS. 3(A) and 3(B) are schematic views illustrating the entire configuration of the robot system according to this embodiment of the present disclosure, where

One example of processing executed by the robot controlling device 40A according to this embodiment is described with reference to FIGS. 1(A), 1(B), 2, 3(A) and 3(B). FIGS. 3(A) and 3(B) are schematic views illustrating the entire configuration of the robot system according to this embodiment, where FIG. 3(A) is a view in which the third rotational axis is coaxial with the first rotational axis, and FIG. 3(B) is a view in which the second rotational axis and the third rotational axis are then moved on the same side of a second straight line.

First, when the robot controlling device 40A according to this embodiment executes the program stored in the memory 42 by the processor 44, and moves the rotational axis JT6 from a farther side to a closer side than the rotational axis JT2, with respect to the center point of the workpiece W accommodated in the accommodation device 50 (i.e., when the posture of the horizontally articulated robot 20 is changed from the state illustrated in FIG. 1(A) to the state illustrated in FIG. 1(B)) while changing a posture of the horizontally articulated robot 20 to be holdable of the workpiece W accommodated in the accommodating device 50, the robot controlling device 40A brings the rotational axis JT6 to be coaxial with the rotational axis JT2 (see FIG. 3(A)). In other words, the robot controlling device 40A brings the rotational axis JT6 to be coaxial with the rotational axis 2 (in other words, positioned on a circumference of the circle C) while changing the posture of the horizontally articulated robot 20 to be holdable of the workpiece W accommodated in the accommodating device 50, and then, moves the rotational axis JT6 across a straight line $L_2$ (a second straight line) connecting the rotational axis JT2 and the rotational axis JT4.

Here, the robot controlling device 40A according to this embodiment brings the rotational axis JT6 to be coaxial with the rotational axis JT2 so that the rotational axis JT4 is located on a left side of the rotational axis JT2 when seen in the axial directions of the rotational axes JT2 to JT6 in FIG. 3(A) (in other words, in FIG. 3(A), the rotational axis JT4 is located on an opposite side from the straight line $L_1$ with respect to a straight line $L_3$ described later).

Note that whether the rotational axis JT6 is located on the farther side or the closer side from/to the center point of the workpiece W than the rotational axis JT2 can be determined as described below. First, the straight line $L_3$ (a third straight line) connecting the center point of the workpiece W accommodated in the accommodating device 50 and the rotational axis JT2 is defined. Then, if an intersecting point between a perpendicular extended from the rotational axis JT6 toward the straight line $L_3$, and the straight line $L_3$ is located farther than the rotational axis JT2 when seen from the center point of the workpiece W accommodated in the accommodating device 50 (the case illustrated in FIG. 1(A)), the rotational axis JT6 can be determined to be located on the farther side from the center point of the workpiece W than the rotational axis JT2. On the other hand, if the intersecting point is located closer than the rotational axis JT2 when seen from the center point of the workpiece W accommodated in the accommodating device 50 (i.e., the case illustrated in FIGS. 1(B) and 3(B)), the rotational axis JT6 is determined to be located on the closer side to the center point of the workpiece W than the rotational axis JT2.

Finally, the robot controlling device 40A moves each of the rotational axes JT4 and JT6 so that a moving range of the rotational axis JT4 is on the same side as a moving range of the rotational axis JT6 with respect to the straight line $L_3$ (see FIGS. 1(B) and 3(B)). In detail, the robot controlling device 40A moves each of the rotational axes JT4 and JT6 only in one of two ranges which are divided at the straight line $L_3$ as a boundary (a range on the left side of the straight line $L_3$ in FIGS. 1(A), 1(B), 3(A) and 3(B) (on the opposite side from the straight line $L_1$ with respect to the straight line $L_3$)).

Note that, as described above, the horizontally articulated robot 20 has the singular point when the rotational axis JT6 is coaxial with the rotational axis JT2. Then, when the rotational axis JT6 passes through or the vicinity of the rotational axis JT2, each of the rotational axes JT2, JT4, and JT6 is operated so that the joint is positioned when the rotational axis JT6 passes through the vicinity of the singular point, based on an axial interpolation on the basis of results of inverse conversions at a start point and an end point (i.e., the states illustrated in FIGS. 1(A) and 1(B)). Here, the axial interpolation is to operate each of the rotational axes JT2, JT4 and JT6 of the robotic arm 30 by a given angle, and a path of the tip-end part of the robotic arm 30 is not considered unlikely to what is called a "linear interpolation."

Note that the rotational axes JT2 and JT4 operate at rotational speeds same as each other based on the respective axial interpolations until the posture of the robotic arm 30 is changed from the posture illustrated in FIG. 1(A) to the posture illustrated in FIG. 1(B) (i.e., from the posture before the rotational axis JT6 is moved across the straight line $L_3$ to the posture after the rotational axis JT6 is moved across the straight line $L_3$). Note that execution of such an axial interpolation is conventionally known as disclosed in Patent Document 1.

(Effects)

Conventionally, there is the problem that the posture of the robotic arm rapidly changes when the robotic arm passes through the vicinity of the singular point.

Figure 13:
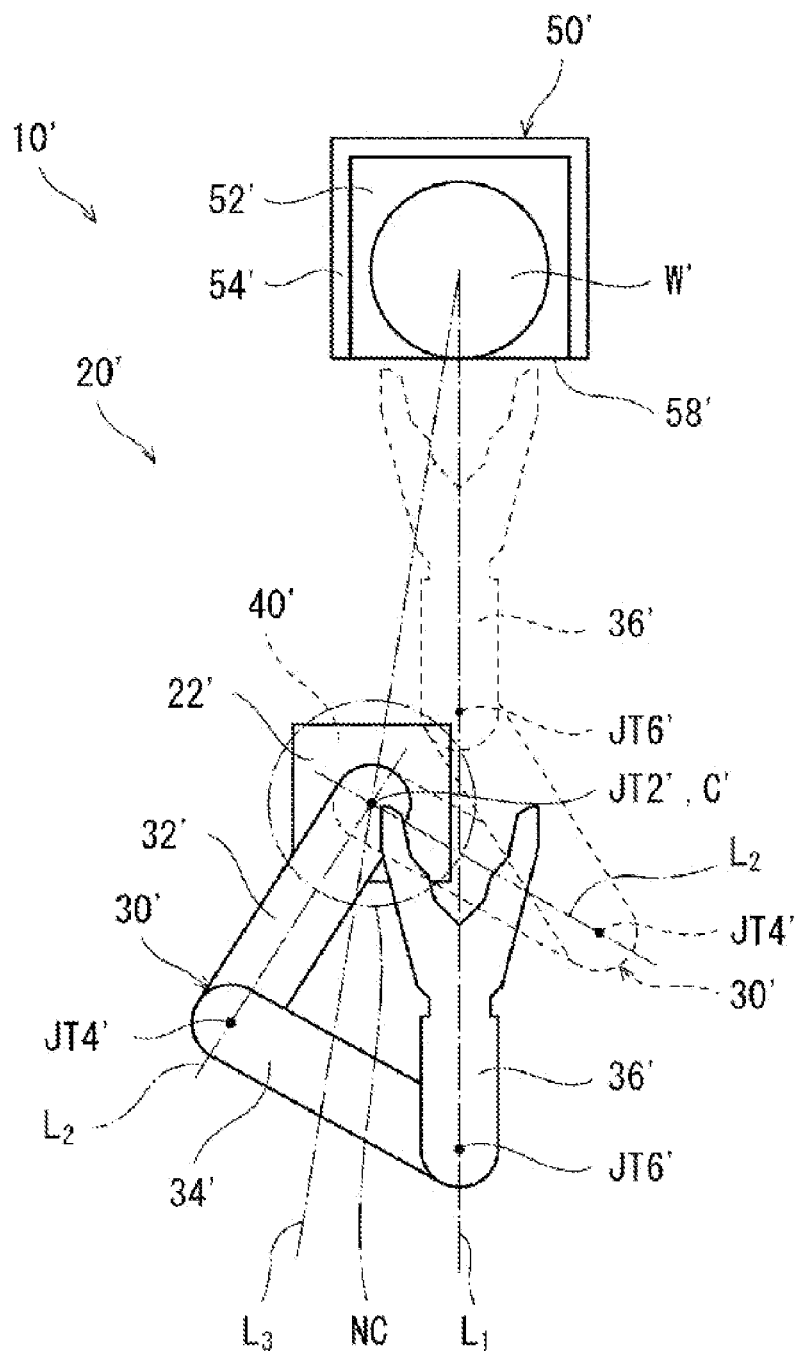
FIG. 13 is a schematic view illustrating a state in which a conventional robot controlling device controls operation of a horizontally articulated robot which performs work to a workpiece accommodated in an accommodating device.

FIG. 13 is a schematic view illustrating a state in which the conventional robot controlling device controls operation of a horizontally articulated robot which performs work to a workpiece accommodated in an accommodating device. As illustrated in FIG. 13, a conventional robot system 10' is provided with a horizontally articulated robot 20' and an accommodating device 50' having similar configurations and the same spatial relationship as the horizontally articulated robot 20 and the accommodating device 50, which are described in the above embodiment.

The conventional horizontally articulated robot 20' illustrated in FIG. 13 has a singular point, similarly to the horizontally articulated robot 20 according to the embodiment described above, when a rotational axis JT6' is coaxial with a rotational axis JT2' (in other words, when the first link 32 overlaps with the second link 34). Therefore, as illustrated in FIG. 13, when the rotational axis JT6' is moved from the farther side to the closer side than the rotational axis JT2', with respect to a workpiece W' accommodated in the accommodating device 50', a posture of a robotic arm 30' is changed rapidly. This is because a robot controlling device 40' changes the posture of the robotic arm 30' so that the rotational axis JT6' does not cross the straight line $L_2$ connecting the rotational axis JT2' and a rotational axis JT4'.

On the other hand, the robot controlling device 40A according to this embodiment brings the rotational axis JT6 to be coaxial with the rotational axis JT2 (i.e., positioned on the circumference of the circle C), and then, moves the rotational axis JT6 across the straight line $L_2$. After that, the robot controlling device 40A moves the rotational axes JT4 and JT6 on the same side of the straight line $L_3$ (the third straight line) connecting the center point of the workpiece W accommodated in the accommodating device 40 and the rotational axis JT2. Each of the rotational axes JT4 and JT6 is moved only in one of the two ranges divided at the straight line $L_3$, as the boundary, connecting the center point of the workpiece W accommodated in the accommodating device 50 and the rotational axis JT2 (in this embodiment, only in the range on the left side of the straight line $L_3$ in FIGS. 1(A), 1(B), 3(A), and 3(B) (on the opposite side from the straight line $L_1$ with respect to the straight line $L_3$)), so that the moving range of the rotational axis JT4 is on the same side as the moving range of the rotational axis JT6 with respect to the straight line $L_3$. Therefore, after the rotational axis JT6 is brought to be coaxial with the rotational axis JT2, operation which may cause the rapid change in the posture of the robotic arm 30 is not performed in the first place. Accordingly, the rapid change in the posture of the robotic arm 30 due to the singular point can be easily prevented.

(Example of Robot Control Method According to Embodiment)

Figure 4:
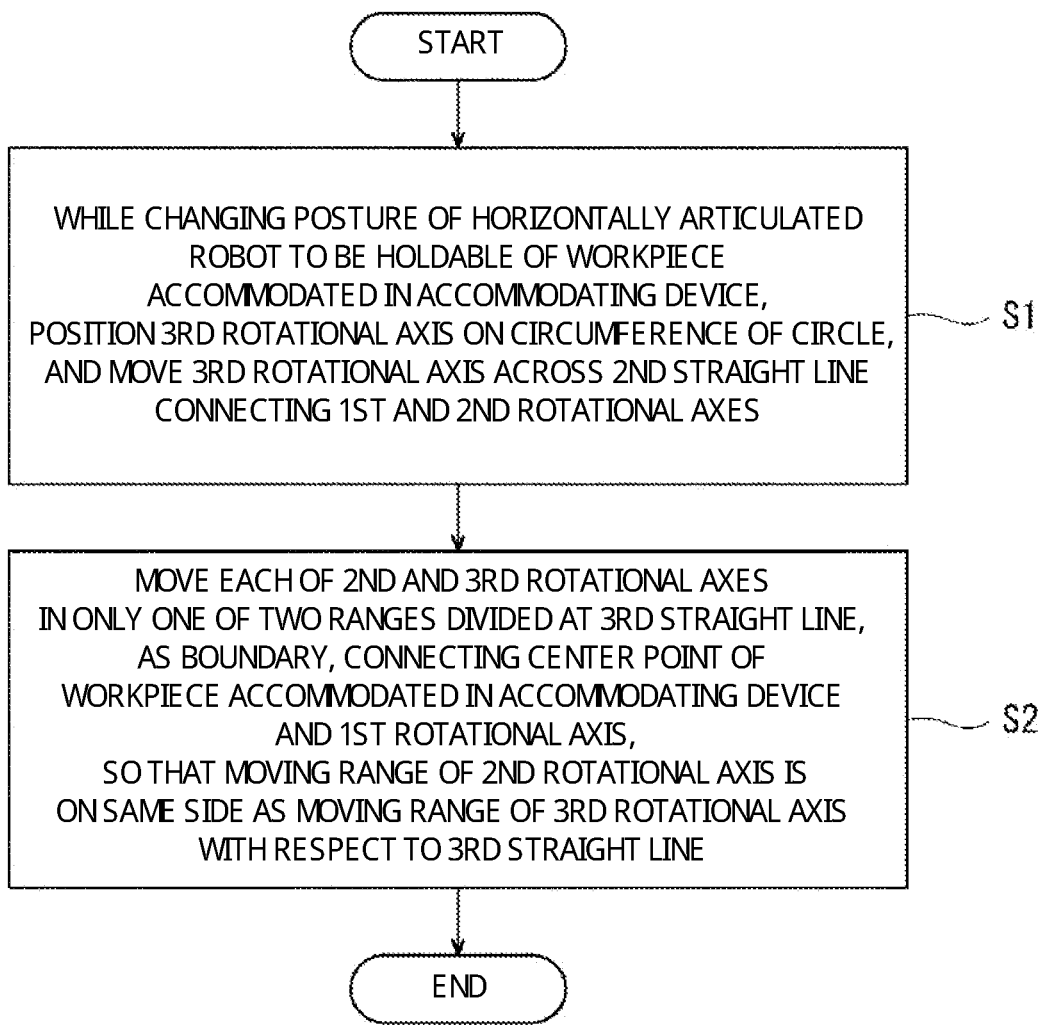
FIG. 4 is a flowchart illustrating one example of a method of controlling a robot according to this embodiment of the present disclosure.

Next, one example of a method of controlling the robot according to this embodiment using the robot controlling device 40A of the embodiment described above, is described with reference to FIG. 4. FIG. 4 is a flowchart illustrating one example of the robot control method according to this embodiment.

It is assumed that the accommodating device 50 and the horizontally articulated robot 20 described in the above embodiment are prepared in advance.

First, while the posture of the horizontally articulated robot 20 is changed to be holdable of the workpiece W accommodated in the accommodating device 50, the rotational axis JT6 is brought to be coaxial with the rotational axis 2 (in other words, positioned on the circumference of the circle C), and then, the rotational axis JT6 is moved across the straight line $L_2$ (the second straight line) connecting the rotational axis JT2 and the rotational axis JT4 (First Step: Step S1 in FIG. 4).

Then, after Step S1, each of the rotational axes JT4 and JT6 is moved in only one of the two ranges divided at the straight line $L_3$ (the third straight line), as the boundary, connecting the center point of the workpiece W accommodated in the accommodating device 50 and the rotational axis JT2, so that the moving range of the rotational axis JT4 is on the same side as the moving range of the rotational axis JT6 with respect to the straight line $L_3$ (Second Step: Step S2 in FIG. 4).

In this manner, the example of the robot control method according to this embodiment can be carried out by using the robot controlling device 40A.

(Modifications)

It is apparent for a person skilled in the art from the above description that many improvements and other embodiments of the present disclosure are possible. Therefore, the above description is to be interpreted only as illustration, and it is provided in order to teach a person skilled in the art the best mode for implementing the present disclosure. The details of the structures and/or the functions may be substantially changed, without departing from the spirit of the present disclosure.

(Modification 1)

Figure 5:
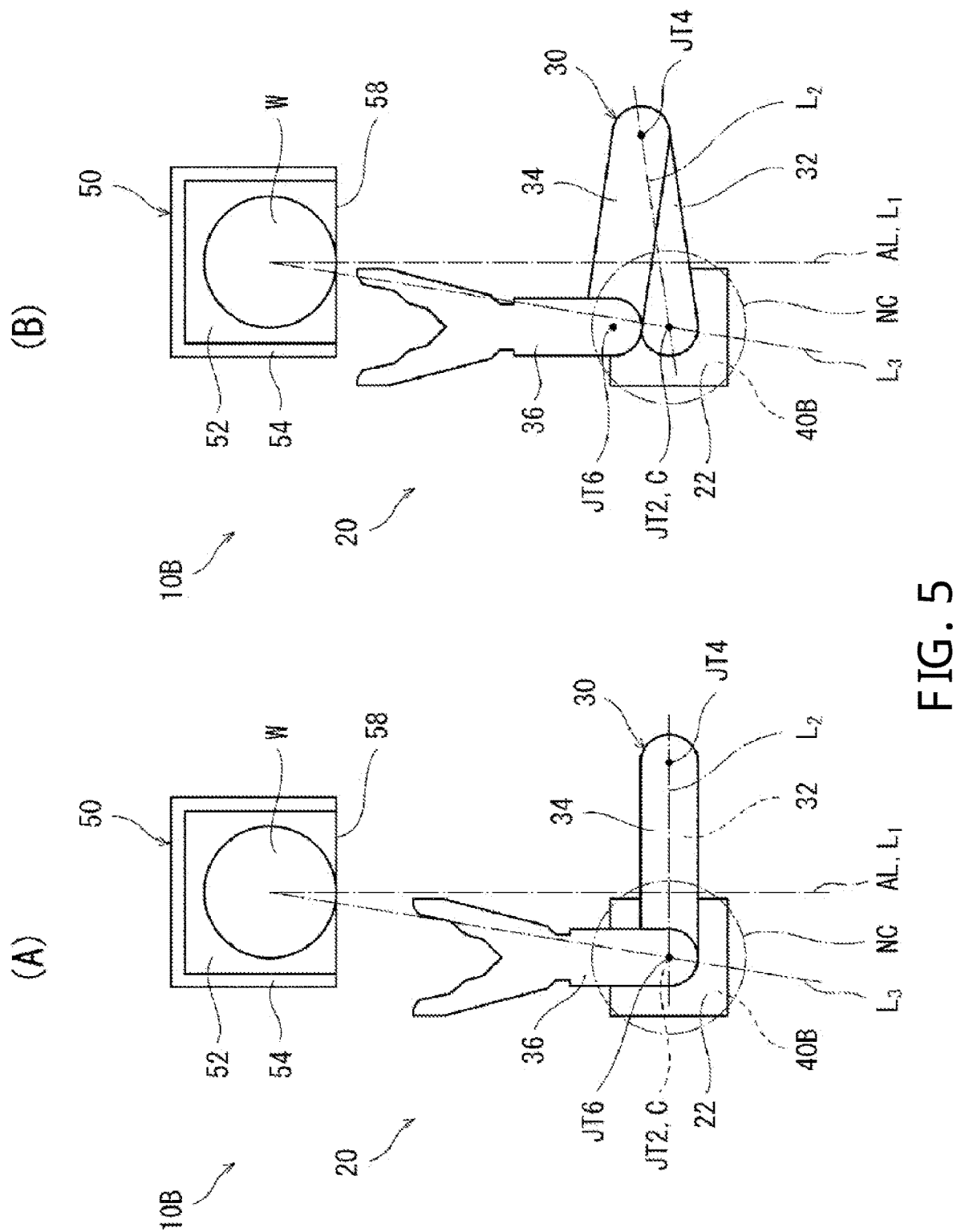
FIGS. 5(A) and 5(B) are views illustrating Modification 1 of the robot system according to this embodiment of the present disclosure, where

Modification 1 of the robot system according to the embodiment described above is described with reference to FIGS. 5(A) and 5(B). FIGS. 5(A) and 5(B) are views illustrating Modification 1 of the robot system according to the above embodiment, where FIG. 5(A) is a view in which the third rotational axis is coaxial with the first rotational axis, and FIG. 5(B) is a view in which the second and third rotational axes are then moved on the opposite sides from each other with respect to the second straight line.

Note that a robot system 10B according to this modification has the same configuration as the robot system 10A according to the embodiment, except for a controlling mode of the horizontally articulated robot 20 by a robot controlling device 40B. Therefore, the same reference characters are given to the same parts, and similar description is not repeated.

When the robot controlling device 40B according to this modification executes the program stored in the memory 42 by the processor 44, and moves the rotational axis JT6 from the farther side to the closer side than the rotational axis JT2, with respect to the center point of the workpiece W accommodated in the accommodation device 50, while changing the posture of the horizontally articulated robot 20 to be holdable of the workpiece W accommodated in the accommodating device 50, the robot controlling device 40B brings the rotational axis JT6 to be coaxial with the rotational axis JT2 (see FIG. 5(A)). In other words, the robot controlling device 40B brings the rotational axis JT6 to be coaxial with the rotational axis 2 (in other words, positioned on the circumference of the circle C) while changing the posture of the horizontally articulated robot 20 to be holdable of the workpiece W accommodated in the accommodating device 50, and then, moves the rotational axis JT6 across the straight line $L_2$ (the second straight line) connecting the rotational axis JT2 and the rotational axis JT4.

Here, in FIG. 5(A), the robot controlling device 40B according to this modification brings the rotational axis JT6 to be coaxial with the rotational axis JT2 so that the rotational axis JT4 is located on the right side of the rotational axis JT2 when seen in the axial directions of the rotational axes JT2 to JT6 (in other words, the rotational axis JT4 is located on one side of the straight line $L_3$ same as the straight line $L_1$).

Finally, the robot controlling device 40B moves each of the rotational axes JT4 and JT6 so that the moving range of the rotational axis JT4 is on one side of the straight line $L_3$ opposite from the moving range of the rotational axis JT6 (see FIG. 5(B)). In detail, the robot controlling device 40B moves the rotational axis JT4 only in one of the two ranges divided at the straight line $L_3$ as the boundary (the range on the right side of the straight line $L_3$ in FIGS. 5(A) and 5(B) (on the same side as the straight line $L_1$ with respect to the straight line $L_3$)). Moreover, the robot controlling device 40B moves the rotational axis JT6 only in the other one of the two ranges divided at the straight line $L_3$ as the boundary (the range on the left side of the straight line $L_3$ in FIGS. 5(A) and 5(B) (on the opposite side from the straight line $L_1$ with respect to the straight line $L_3$)).

(Another Example of Robot Control Method According to Embodiment)

Figure 6:
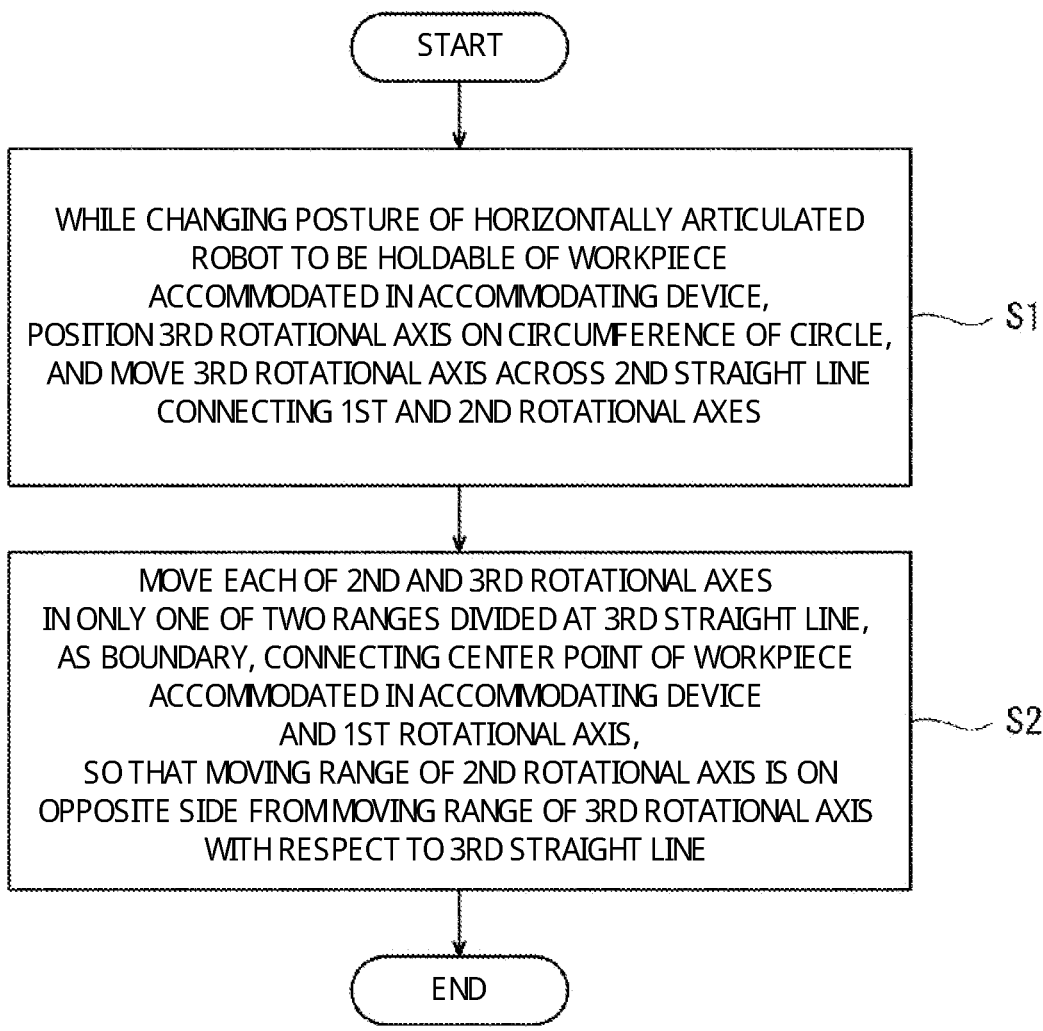
FIG. 6 is a flowchart illustrating another example of the method of controlling the robot according to this embodiment of the present disclosure.

Next, another example of the method of controlling the robot according to this embodiment using the robot controlling device 40B of the embodiment described above, is described with reference to FIG. 6. FIG. 6 is a flowchart illustrating the example of the robot control method according to this embodiment.

First, while the posture of the horizontally articulated robot 20 is changed to be holdable of the workpiece W accommodated in the accommodating device 50, the rotational axis JT6 is brought to be coaxial with the rotational axis 2 (in other words, positioned on the circumference of the circle C), and then, the rotational axis JT6 is moved across the straight line $L_2$ (the second straight line) connecting the rotational axis JT2 and the rotational axis JT4 (First Step: Step S1 in FIG. 6).

Then, after Step S1, each of the rotational axes JT4 and JT6 is moved in only one of the two ranges divided at the straight line $L_3$, as the boundary, connecting the center point of the workpiece W accommodated in the accommodating device 50 and the rotational axis JT2, so that the moving range of the rotational axis JT4 is on the opposite side from the moving range of the rotational axis JT6 with respect to the straight line $L_3$ (Second Step: Step S2 in FIG. 6).

In this manner, the example of the robot control method according to this embodiment can be carried out by using the robot controlling device 40B.

(Modification 2)

Figure 7:
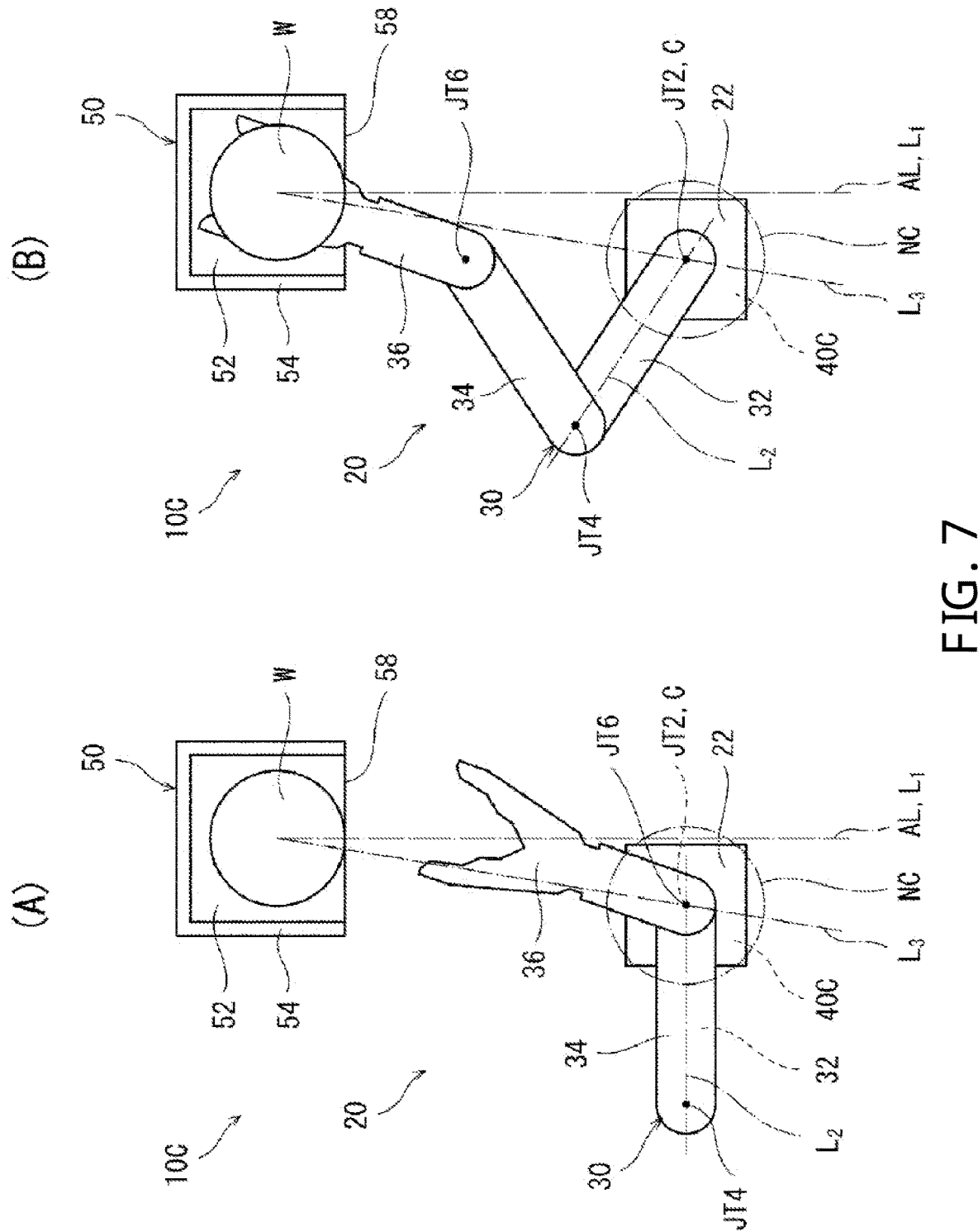
FIGS. 7(A) and 7(B) are views illustrating Modification 2 of the robot system according to this embodiment of the present disclosure, where

Modification 2 of the robot system according to the embodiment described above is described with reference to FIGS. 7(A) and 7(B). FIGS. 7(A) and 7(B) are views illustrating Modification 2 of the robot system according to the above embodiment, where FIG. 7(A) is a view in which the third rotational axis is coaxial with the first rotational axis while the robot hand is inclined at a given angle with respect to the first straight line, and FIG. 7(B) is a view in which the robot hand is in the posture holdable of the workpiece accommodated in the accommodating device while the robot hand is inclined at the given angle with respect to the first straight line. Note that a robot system 10C according to this modification has the same configuration as the robot systems 10A and 10B described above, except for a controlling mode of the horizontally articulated robot 20 by a robot controlling device 40C. Therefore, the same reference characters are given to the same parts, and similar description is not repeated.

As illustrated in FIGS. 7(A) and 7(B), in this modification, when the processor 44 executes the program stored in the memory 42, over the entire path for the change in the posture of the horizontally articulated robot 20 from the posture where the rotational axis JT6 is coaxial with the rotational axis JT2 (in other words, positioned on the circumference of the circle C) to the posture where the workpiece W accommodated in the accommodating device 50 can be held, the robot hand 36 moves linearly in parallel with the straight line $L_1$ while being inclined at the given angle with respect to the straight line $L_1$, and takes the posture holdable of the workpiece W accommodated in the accommodating device 50. In this modification, at least a part of the straight line $L_1$ matches a path of the center of the workpiece W, along which the robot hand 36 accesses the accommodating device 50 (a workpiece access line).

Note that until the robotic arm 30 is changed so that the posture of the horizontally articulated robot 20 is changed from the posture where the rotational axis JT6 is coaxial with the rotational axis JT2, to the posture holdable of the workpiece W accommodated in the accommodating device 50 (i.e., until the posture of the robotic arm 30 is changed from a contracted posture to an expanded posture), the rotational axes JT2 and JT4 operate at the rotational speeds same as each other based on the respective axial interpolations.

Here, when the robot hand 36 is in the posture holdable of the workpiece W accommodated in the accommodating device 50, the robot hand 36 may contact the wall surface 54 of the accommodating device 50 since the rotational axis JT2 separates from the straight line $L_1$ by the given distance. In terms of this, according to this modification, since the robot hand 36 is brought to the posture holdable of the workpiece W accommodated in the accommodating device 50 while being inclined at the given angle with respect to the straight line $L_1$, the problem can be avoided.

Moreover, according to this modification, since the robot hand 36 moves linearly in parallel with the straight line $L_1$ while being inclined at the given angle with respect to the straight line $L_1$ over the entire path, an operation plan of the robotic arm 30 can be easily created. Accordingly, the robot controlling device 40C according to this modification can more easily prevent the rapid change in the posture of the robotic arm 30 due to the singular point.

Moreover, instead of that the robot hand 36 moves linearly in parallel with the straight line $L_1$ over the entire path for the change in the posture of the horizontally articulated robot 20 from the posture where the rotational axis JT6 is coaxial with the rotational axis JT2, to the posture where of the workpiece W accommodated in the accommodating device 50 can be held, the robot hand 36 may move linearly in parallel with the straight line $L_1$ at least in a part of the path.

Moreover, the inclination of the robot hand 36 with respect to the straight line $L_1$ may be increased (i.e., the rotational axis JT6 may be rotated in a clockwise direction in FIGS. 7(A) and 7(B)) as the robot hand 36 approaches the opening 58 of the accommodating device 50, and the robot hand 36 may be inclined with respect to the straight line $L_1$ at the given angle before the robot hand 36 reaches the opening 58 of the accommodating device 50.

(Modification 3)

Figure 8:
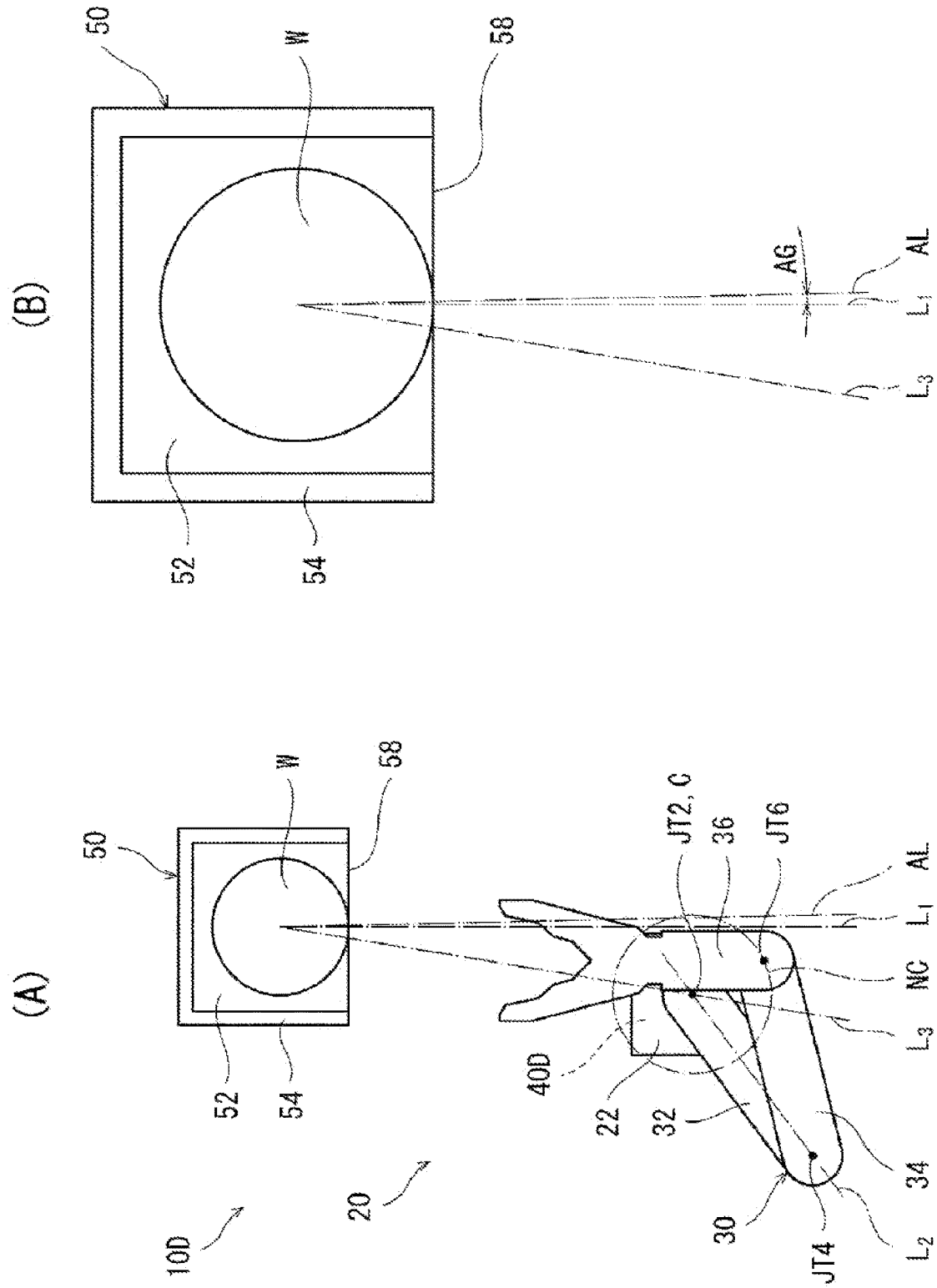
FIGS. 8(A) and 8(B) are views illustrating Modification 3 of the robot system according to this embodiment of the present disclosure, where

Modification 3 of the robot system according to the embodiment described above is described with reference to FIGS. 8(A) and 8(B). FIGS. 8(A) and 8(B) are views illustrating Modification 3 of the robot system of the embodiment, where FIG. 8(A) is a plan view illustrating the entire configuration of the robot system, and FIG. 8(B) is an enlarged plan view illustrating the accommodating device which accommodates the workpiece, and its peripheral part. Note that a robot system 10D according to this modification has the same configuration as the robot systems 10A to 10C according to the embodiment described above, except for a relation between the access straight line AL and the straight line $L_1$. Therefore, the same reference characters are given to the same parts, and similar description is not repeated.

In the embodiment and Modifications 1 and 2 described above, the acute angle formed between the access straight line AL and the straight line $L_1$ (in other words, the acute angle formed between the access straight line AL and the perpendicular extended from the center point of the workpiece W to the opening 58) is 0° (i.e., the access straight line AL coincides with the straight line $L_1$). The access straight line AL is, when seen in the axial directions of the rotational axes JT2 to JT6, in parallel with the direction in which the workpiece W is linearly moved without being contacted to the wall surface 54 by the robot hand 36 during the robot hand 36 taking out the workpiece W accommodated in the accommodating device 50, or during the robot hand 36 accommodating the workpiece W into the accommodating device 50, and the access straight line AL passes through the center point of the workpiece W accommodated in the accommodating device 50. Moreover, the horizontally articulated robot 20 is disposed such that the straight line $L_1$ (and the access straight line AL) passes the vicinity of the rotational axis JT2 (in other words, the circumference of the circle C).

However, it is not limited to this, and as illustrated in FIG. 8(B), the straight line AL may not coincide with the straight line $L_1$. That is, the taking-out operation and the accommodating operation may be performed without coinciding with the straight line $L_1$ when seen in the axial directions of the rotational axes JT2 to JT6.

Moreover, for example, the access straight line AL may be defined to vertically intersect with at least a part of the opening 58 when seen in the axial directions of the rotational axes JT2 to JT6.

Alternatively, for example, the access straight line AL may be defined to be in parallel with at least a part of the wall surface 54 when seen in the axial directions of the rotational axes JT2 to JT6.

Note that when only the placing part 52 is provided alternative to the accommodating device 50 having the placing part 52, the wall surface 54, and the opening 58, the access straight line AL may be a line, when seen in the axial directions of the rotational axes JT2 to JT6, in parallel with a direction in which the workpiece W is linearly moved by the robot hand 36 during the robot hand 36 holding the workpiece W placed on the placing part 52, or during the robot hand 36 placing the workpiece W on the placing part 52, and the access straight line AL passes through the center point of the workpiece W placed on the placing part 52. Then, the placing part 52 and the horizontally articulated robot 20 may be disposed such that the access straight line AL does not coincide with the straight line $L_3$ connecting the center point of the workpiece W placed on the placing part 52 and the rotational axis JT2.

Moreover, a range in which the workpiece W is linearly moved by the robot hand 36, during the holding operation or the placing operation, is, when seen in the axial directions of the rotational axes JT2 to JT6, an overlapping range of at least a part of a range where the workpiece W placed on the placing part 52 exists, and at least a part of a range where the workpiece W held by the robot hand 36 exists. The access straight line AL may be defined so as to overlap with the linearly moving path of the center point of the workpiece W within the moving range when seen in the axial directions of the rotational axes JT2 to JT6.

(Modification 4)

Figure 9:
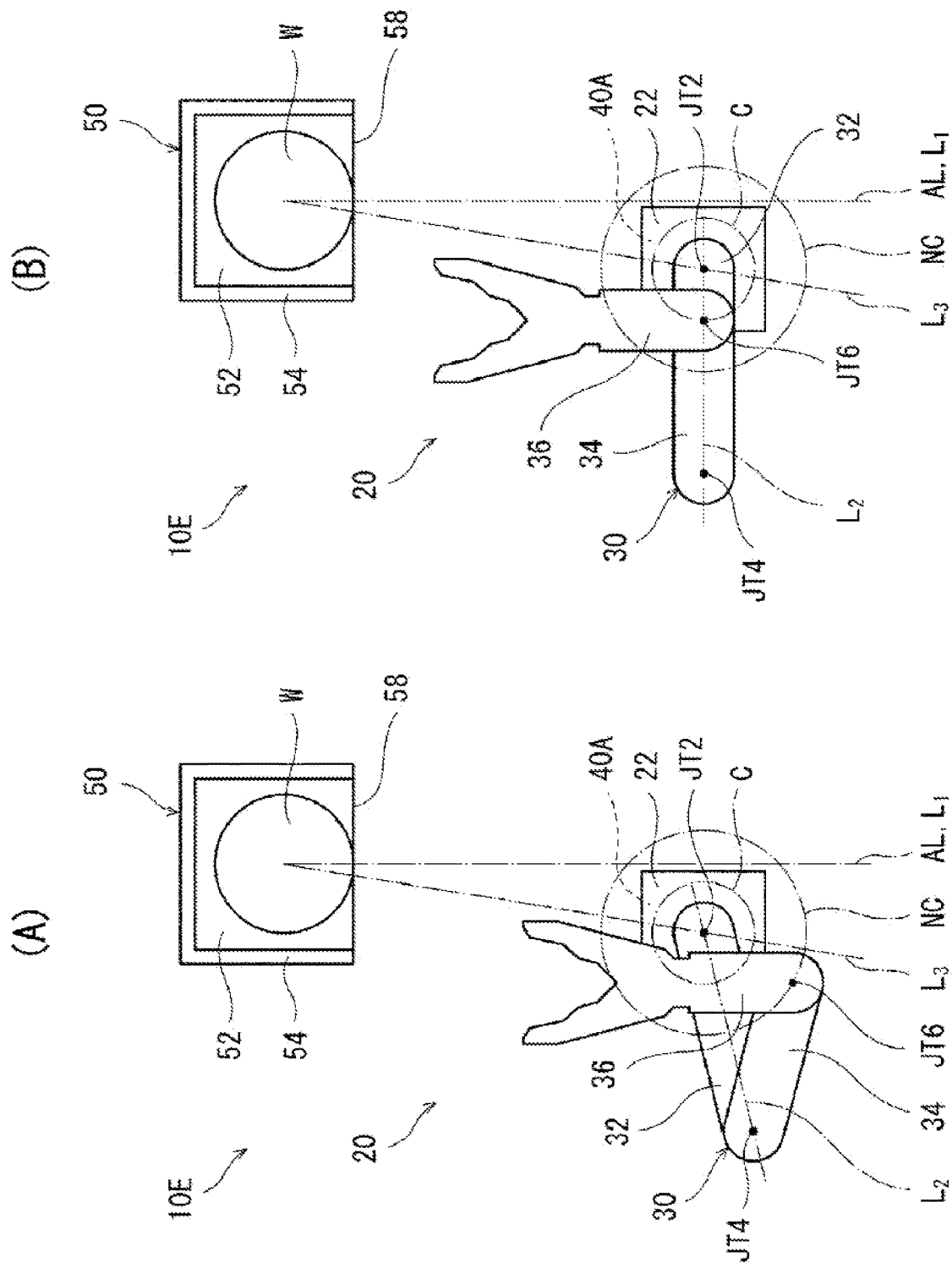
FIGS. 9(A) and 9(B) are schematic views illustrating Modification 4 of the robot system according to this embodiment of the present disclosure, where
Figure 10:
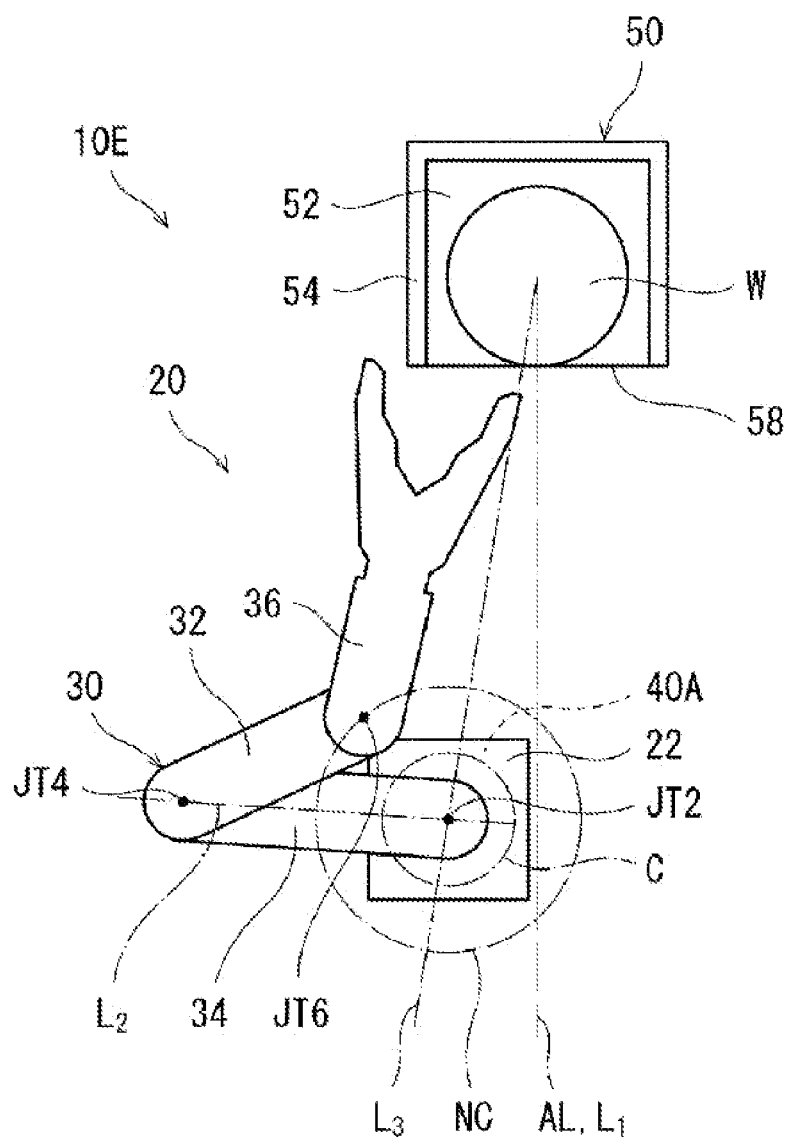
FIG. 10 is a view illustrating Modification 4 of the robot system according to this embodiment of the present disclosure, where

Modification 3 of the robot system according to the embodiment described above is described with reference to FIGS. 9(A), 9(B), and 10. FIGS. 9(A) and 9(B) are schematic views illustrating Modification 4 of the robot system of the embodiment. FIG. 10 is a view illustrating Modification 4 of the robot system of this embodiment of the present disclosure, where FIG. 10(A) is a view where the third rotational axis is positioned on the circumference of the circle C when seen in the axial direction, and FIG. 10(B) is a view in which the second and third rotational axes are then moved on the same side of the second straight line.

Note that a robot system 10E according to this modification has the same configuration as the robot systems 10A to 10D according to the embodiment described above, except for that the distance between the rotational axis JT2 and the rotational axis JT4 is different from the distance between the rotational axis JT4 and the rotational axis JT6, and thus, the lengths of the first link 32 and the second link 34 are different from each other. Therefore, the same reference characters are given to the same parts, and similar description is not repeated.

In the embodiment and Modifications 1 to 3 described above, the distance between the rotational axis JT2 and the rotational axis JT4 is the same as the distance between the rotational axis JT4 and the rotational axis JT6 (in other words, the length of the first link 32 is the same as the length of the second link 34). Accordingly, in the embodiment and Modifications 1 to 3, when the circle C is defined to have the center at the rotational axis JT2, and the radius at the difference between the distance from the rotational axis JT2 to the rotational axis JT4 and the distance from the rotational axis JT4 to the rotational axis JT6, the radius of the circle C is zero, and thus, the circle C coincides with the rotational axis JT2.

On the other hand, as illustrated in FIGS. 9(A) and 9(B), in the robot system 10E according to this modification, the distance between the rotational axis JT2 and the rotational axis JT4 is longer than the distance between the rotational axis JT4 and the rotational axis JT6 (in other words, the first link 32 is longer than the second link 34). Therefore, the circle C centering on the rotational axis JT2 with the radius at the difference between the distance from the rotational axis JT2 to the rotational axis JT4 and the distance from the rotational axis JT4 to the rotational axis JT6, does not coincide with the rotational axis JT2.

In this modification, the horizontally articulated robot 20 is disposed opposing to the opening 58 such that the straight line $L_1$ (the first straight line), which is the extended line of the perpendicular from the center point of the workpiece W accommodated in the accommodating device 50 to the opening 58, passes the vicinity of the circle C, when seen in the axial directions of the rotational axes JT1 to JT3.

In FIGS. 9(A), 9(B), and 10, the "vicinity of the circle C" is inside the neighbouring circle NC having the center at the rotational axis JT2 when seen in the axial direction. Note that the vicinity of the circle C is not limited to the case illustrated in FIGS. 9(A), 9(B), and 10, but similar to the embodiment and Modifications 1 to 3, it may be arbitrarily set to a given vicinity area. Details will be described later.

First, when the processor 44 executes the program stored in the memory 42, during changing of the posture of the horizontally articulated robot 20 so as to be holdable of the workpiece W accommodated in the accommodating device 50, the robot controlling device 40E according to this modification positions the rotational axis JT6 on the circumference of the circle C, and then, moves the rotational axis JT6 across the straight line $L_2$ (the second straight line) connecting the rotational axis JT2 and the rotational axis JT4.

Here, the robot controlling device 40E according to this modification positions the rotational axis JT6 on the circumference of the circle C when seen in the axial direction, so that that the rotational axis JT4 is located on the left side of the rotational axis JT2 in FIG. 9(B) (the side opposite from the straight line $L_1$ with respect to the straight line $L_3$) (in other words, the rotational axis JT4 is located on the opposite side from the straight line $L_1$ with respect to the straight line $L_3$ in FIG. 9(B)).

Finally, the robot controlling device 40E moves each of the rotational axes JT4 and JT6 so that the moving range of the rotational axis JT4 is on the same side as the moving range of the rotational axis JT6 with respect to the straight line $L_3$ (see FIGS. 9(B) and 10). In detail, the robot controlling device 40E moves each of the rotational axes JT4 and JT6 only in one of the two ranges divided at the straight line $L_3$ as the boundary (the range on the left side of the straight line $L_3$ in FIGS. 9(A), 9(B), and 10 (on the opposite side from the straight line $L_1$ with respect to the straight line $L_3$)).

Note that in this modification the posture of the horizontally articulated robot 20 corresponding to the singular point is when the rotational axis JT6 is positioned on the circumference of the circle C when seen in the axial direction.

(Other Modifications)

The method of operating the robot according to the present disclosure is not limited to those described in the embodiment and Modification 1. For example, the robot system 10A (or 10B) may be used to bring the rotational axis JT6 to be positioned on the rotational axis 2 (in other words, on the circumference of the circle C) when seen in the axial direction, and then, move each the rotational axes JT4 and JT6 only in the right-side range of the straight line $L_3$ in FIGS. 3(A) and 3(B) (or in FIGS. 5(A) and 5(B)) (the same side as the straight line $L_1$ with respect to the straight line $L_3$) among the two ranges divided at the straight line $L_3$ as the boundary.

Alternatively, in the robot control method according to the present disclosure, for example, the robot system 10A (or 10B) may be used to bring the rotational axis JT6 to be positioned on the rotational axis JT2 (in other words, on the circumference of the circle C) when seen in the axial direction, and then, move the rotational axis JT4 only in the left-side range of straight line $L_3$ in FIGS. 3(A) and 3(B) (or in FIGS. 5(A) and 5(B)) (the opposite side from the straight line $L_1$ with respect to the straight line $L_3$) among the two ranges divided at the straight line $L_3$ as the boundary, and move the rotational axis JT6 only in the right-side range of straight line $L_3$ in FIGS. 3(A) and 3(B) (or in FIGS. 5(A) and 5(B)) (the same side as the straight line $L_1$ with respect to the straight line $L_3$) among the two ranges divided at the straight line $L_3$ as the boundary.

Figure 11:
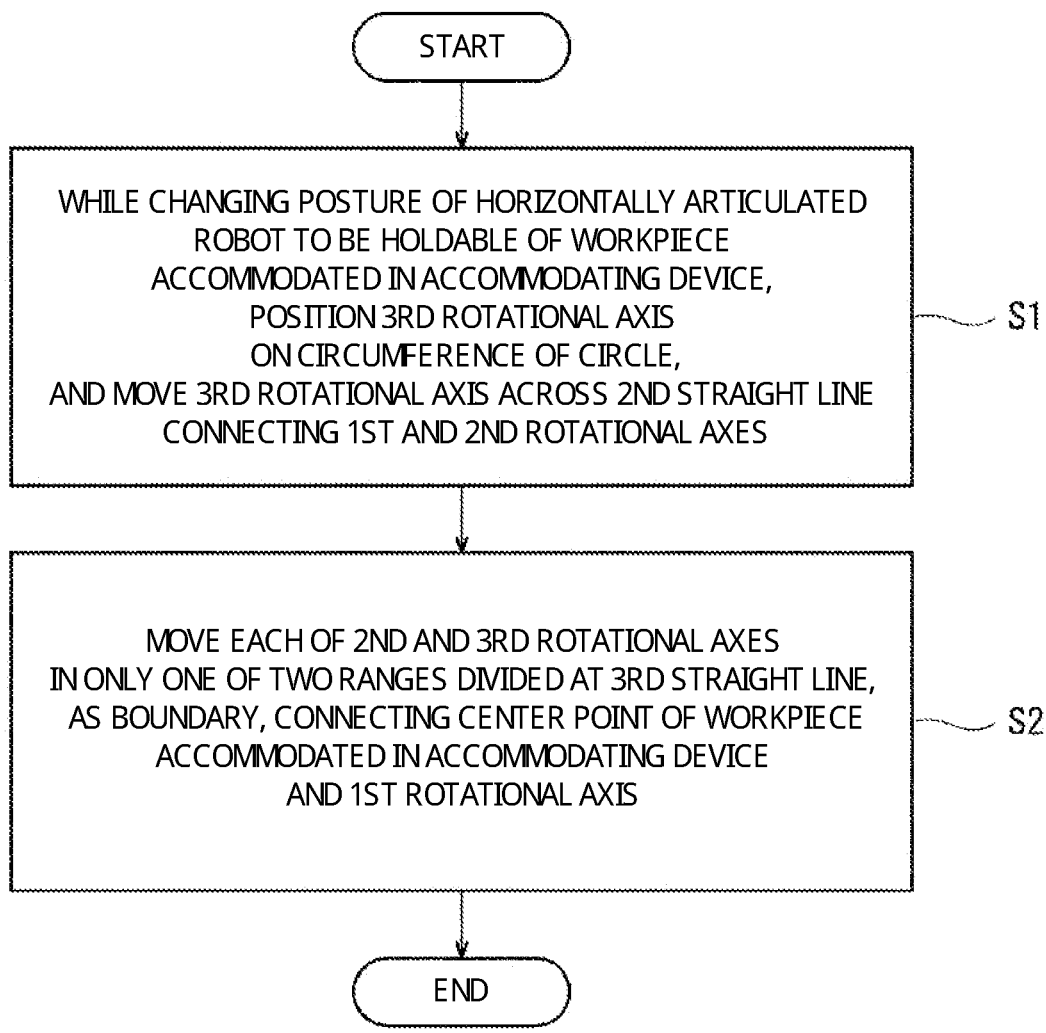
FIG. 11 is a flowchart illustrating the method of controlling the robot according to this embodiment of the present disclosure.

FIG. 11 is a flowchart illustrating the method of controlling the robot according to one embodiment of the present disclosure. A generic concept of the contents described above is illustrated as in the flowchart of FIG. 11.

In the robot control method according to this embodiment of the present disclosure, for example, any of the robot systems 10A to 10E is used to, first, bring the rotational axis JT6 to be positioned on the circumference of the circle C during changing of the posture of the horizontally articulated robot 20 to be holdable of the workpiece W accommodated in the accommodating device 50, and then, move the rotational axis JT6 across the straight line $L_2$ (the second straight line) connecting the rotational axis JT2 and the rotational axis JT6 (Step S1 in FIG. 11).

Finally, each of the rotational axes JT4 and JT6 is moved only in one of the two ranges divided at the straight line $L_3$ (the third straight line), as the boundary, connecting the center point of the workpiece W accommodated in the accommodating device 50 and the rotational axis JT2.

Figure 12:
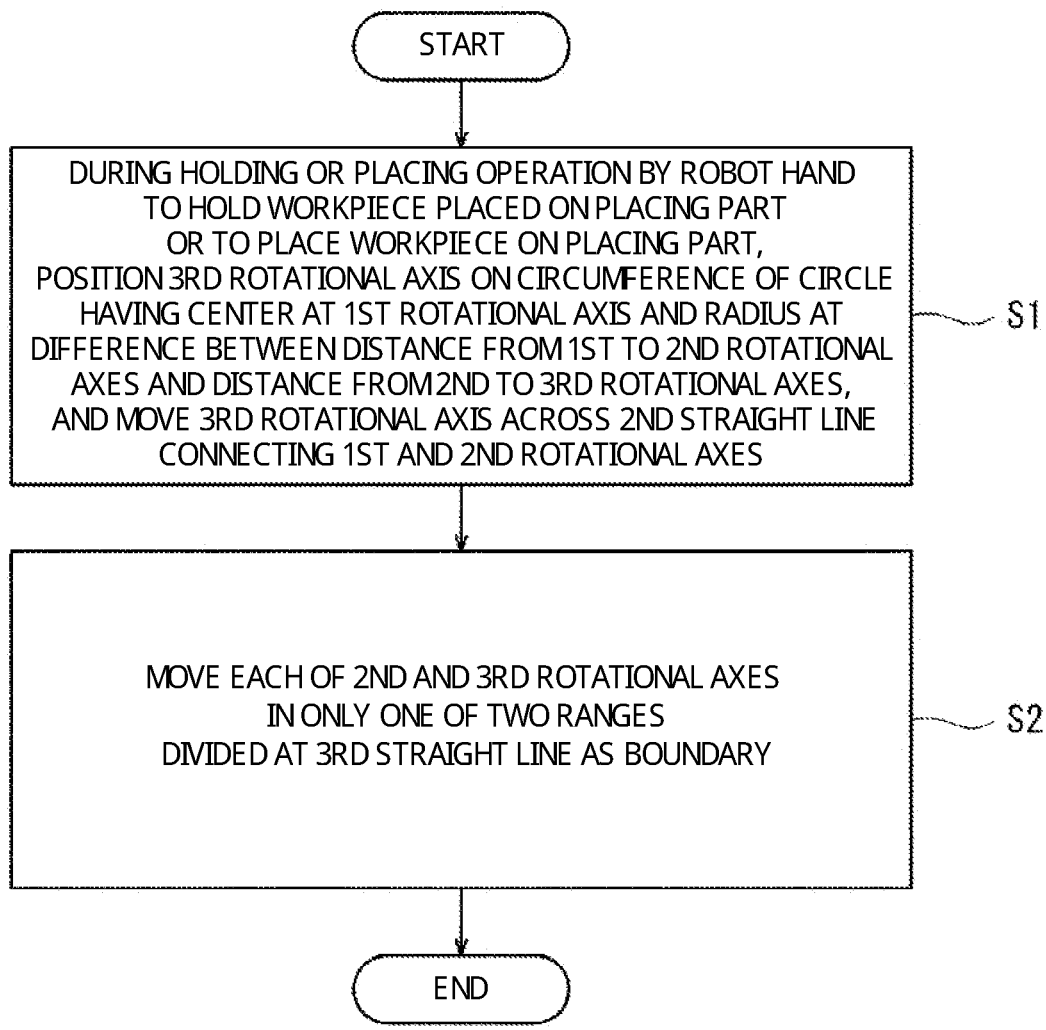
FIG. 12 is a flowchart illustrating the method of controlling the robot according to the present disclosure.

FIG. 12 is a flowchart illustrating the method of controlling the robot according to the present disclosure. A further generic concept of the contents described with reference to FIG. 11 is illustrated as in the flowchart of FIG. 12.

In the robot control method according to the present disclosure, the placing part on which the workpiece is placed, and the horizontally articulated robot are prepared in advance. The horizontally articulated robot includes the first rotational axis, the first link attached at its base-end part to the first rotational axis so as to be rotatable about the first rotational axis, the second rotational axis provided to the tip-end part of the first link, the second link attached at its base-end part to the second rotational axis so as to be rotatable about the second rotational axis, the third rotational axis provided to the tip-end part of the second link, and the robot hand attached at its base-end part to the third rotational axis so as to be rotatable about the third rotational axis.

Then, in the robot control method according to the present disclosure, the placing part and the horizontally articulated robot are disposed such that, during the robot hand holding the workpiece placed on the placing part, or during the robot hand placing the workpiece on the placing part, the access straight line does not match the third straight line connecting the center point of the workpiece placed on the placing part and the first rotational axis. The access straight line is a line in parallel with the direction in which the workpiece is linearly moved by the robot hand when seen in the axial directions of the first to third rotational axes, and passing through the center point of the workpiece placed on the placing part.

Moreover, in the robot control method according to the present disclosure, during the holding operation or the placing operation, the third rotational axis is positioned on the circumference of the circle centering the first rotational axis with the radius at the difference between the distance from the first rotational axis to the second rotational axis and the distance from the second rotational axis to the third rotational axis, and then, the third rotational axis is moved across the second straight line connecting the first rotational axis and the second rotational axis (Step S1 in FIG. 12).

Finally, in the robot control method according to the present disclosure, each of the second and third rotational axes is moved only in one of the two ranges divided at the third straight line as the boundary (Step S2 in FIG. 12).

In the embodiment and Modifications 1 to 4 as illustrated in FIG. 3(A), 5(A), 7(A), or 9(B), the rotational axis JT6 is positioned on the circumference of the circle C (or at the rotational axis JT2) when seen in the axial direction, while the straight line $L_2$ (the second straight line) extends orthogonally to the straight line $L_1$ (the first straight line) (in other words, while the straight line $L_2$ extends in the left-and-right direction in the drawing). However, it is not limited to this, but the rotational axis JT6 may be positioned on the circumference of the circle C (or at the rotational axes JT2) when seen in the axial direction, while the second straight line $L_2$ extends in a direction other than orthogonal to the straight line $L_1$.

Although in the embodiment and Modifications 1 and 2 the access straight line AL is illustrated in the drawings, it is not limited to this. That is, when the acute angle formed between the access straight line AL and the straight line $L_1$ (in other words, the acute angle between the access straight line and the perpendicular extended from the center point of the workpiece W to the opening 58) is 0° similarly to the embodiment and the Modifications 1 and 2, the access straight line AL is unnecessary to be considered. Therefore, in the embodiment and Modifications 1 and 2, the access straight line AL may not exist.

In the embodiment and Modifications 1 to 4, the cases are described, in which the distance between the rotational axis JT2 and the rotational axis JT4 is the same as the distance between the rotational axis JT4 and the rotational axis JT6, and in which the distance between the rotational axis JT2 and the rotational axis JT4 is longer than the distance between the rotational axis JT4 and the rotational axis JT6. However, it is not limited to this, but the distance between the rotational axis JT2 and the rotational axis JT4 may be shorter than the distance between the rotational axis JT4 and the rotational axis JT6.

In the embodiment and Modifications 1 to 4, the "vicinity of the circle C" is inside the neighbouring circle NC having the center at the rotational axis JT2 when seen in the axial direction. However, it is not limited to this, but the vicinity of the rotational axis JT2 may be set as an area inside a circle having a radius different from that of the neighbouring circle NC, an area inside a quadrilateral, or a vicinity area of another mode.

Note that, conventionally, as illustrated in FIG. 12, when the distance between the straight line $L_1$ (the first straight line) and the rotational axis JT2' is shorter than the distance between the rotational axis JT4' and the rotational axis JT6', the rapid change in the posture of the robotic arm 30' may easily occur. Therefore, in the present disclosure, the neighbouring circle NC may be defined so as to have the center at the rotational axis JT2 and the radius at the distance between the rotational axis JT2 and the rotational axis JT6.

Moreover, the radius of the neighbouring circle NC may be defined such that, when the robot hand 36 (in other words, the rotational axis JT6) is moved at the maximum linear-motion speed inside the neighbouring circle NC so as not to pass through the rotational axis JT2 when seen in the axial directions of the rotational axes JT2 to JT6, any of a rotational speed, a rotational acceleration, a derivative value of the rotational acceleration, and a current value of the motor which drives the rotational axis JT2, JT4, or JT6, may exceed an upper limit value set in advance. Note that, the "maximum linear-motion speed" as used herein means the maximum value of a linear-motion speed in the entire movable range of the robot hand 36.

DESCRIPTION OF REFERENCE CHARACTERS

10 Robot System
20 Horizontally Articulated Robot
22 Pedestal
30 Robotic Arm
32 First Link
34 Second Link
36 Robot Hand
40 Robot Controlling Device
42 Memory
42 Processor
44 Accommodating Device
50 Placing Part
52 Wall Surface
58 Opening
AL Access Straight Line
AG Acute Angle
C Circle
NC Neighbouring Circle
JT Rotational Axis
L Straight Line
W Workpiece

What is claimed is:

1. A robot controlling device configured to control operation of a horizontally articulated robot configured to perform a work to a workpiece accommodated in an accommodating device,
wherein the accommodating device includes a placing part on which the workpiece is placed, a wall surface, and an opening,
wherein the horizontally articulated robot includes a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis, and
wherein the horizontally articulated robot is disposed opposing to the opening such that a first straight line passes a vicinity of a circle centering on the first rotational axis with a radius at a difference between a distance from the first rotational axis to the second rotational axis and a distance from the second rotational axis to the third rotational axis, the first straight line being an extended line of a perpendicular from a center point of the workpiece accommodated in the accommodating device to the opening when seen in axial directions of the first to third rotational axes,
the robot controlling device comprising:
a memory; and
a processor configured to execute a program stored in the memory,
wherein, when the program stored in the memory is executed by the processor, the robot controlling device brings the third rotational axis to be positioned on a circumference of the circle while changing a posture of the horizontally articulated robot to be holdable of the workpiece accommodated in the accommodating device, and moves the third rotational axis across a second straight line connecting the first rotational axis and the second rotational axis, and then moves each of the second rotational axis and the third rotational axis only in one of two ranges divided at a third straight line, as a boundary, connecting the center point of the workpiece accommodated in the accommodating device and the first rotational axis,
wherein the robot hand is linearly moved in parallel with the first straight line while being inclined at a given angle toward the first straight line and with respect to the first straight line, over the entire path along which the posture of the horizontally articulated robot is changed from a posture in which the third rotational axis is coaxial with the first rotational axis when seen in the axial directions, to a posture holdable of the workpiece accommodated in the accommodating device, and is brought to the posture holdable of the workpiece accommodated in the accommodating device while being inclined at the given angle with respect to the first straight line, and
wherein, after the third rotational axis is positioned on the circumference, a range in which the second rotational axis moves is on the same side as a range in which the third rotational axis moves with respect to the third straight line, when seen in the axial directions.

2. The robot controlling device of claim 1, wherein, when the program stored in the memory is executed by the processor, and the third rotational axis passes the circumference, or inside or the vicinity of the circle, each of the first to third rotational axes is operated based on an axial interpolation.

3. A robot controlling device configured to control operation of a horizontally articulated robot configured to perform a work to a workpiece accommodated in an accommodating device,
wherein the accommodating device includes a placing part on which the workpiece is placed, a wall surface, and an opening,
wherein the horizontally articulated robot includes a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis, and
wherein the horizontally articulated robot is disposed opposing to the opening such that a first straight line passes a vicinity of a circle centering on the first rotational axis with a radius at a difference between a distance from the first rotational axis to the second rotational axis and a distance from the second rotational axis to the third rotational axis, the first straight line being an extended line of a perpendicular from a center point of the workpiece accommodated in the accommodating device to the opening when seen in axial directions of the first to third rotational axes, the robot controlling device comprising:

a memory; and a processor configured to execute a program stored in the memory, wherein, when the program stored in the memory is executed by the processor, the robot controlling device brings the third rotational axis to be positioned on a circumference of the circle while changing a posture of the horizontally articulated robot to be holdable of the workpiece accommodated in the accommodating device, and moves the third rotational axis across a second straight line connecting the first rotational axis and the second rotational axis, and then moves each of the second rotational axis and the third rotational axis only in one of two ranges divided at a third straight line, as a boundary, connecting the center point of the workpiece accommodated in the accommodating device and the first rotational axis, wherein the robot hand is linearly moved in parallel with the first straight line while being inclined at a given angle toward the first straight line and with respect to the first straight line, over the entire path along which the posture of the horizontally articulated robot is changed from a posture in which the third rotational axis is coaxial with the first rotational axis when seen in the axial directions, to a posture holdable of the workpiece accommodated in the accommodating device, and is brought to the posture holdable of the workpiece accommodated in the accommodating device while being inclined at the given angle with respect to the first straight line, and wherein, after the third rotational axis is positioned the circumference, a range in which the second rotational axis moves is on the opposite side from a range in which the third rotational axis moves with respect to the third straight line, when seen in the axial directions.

4. The robot controlling device of claim 3, wherein, when the program stored in the memory is executed by the processor, and the third rotational axis passes the circumference, or inside or the vicinity of the circle, each of the first to third rotational axes is operated based on an axial interpolation.

5. A robot system, comprising:

the robot controlling device of claim 3;

the horizontally articulated robot of which operation is controlled by the robot controlling device; and the accommodating device configured to accommodate the workpiece to which the horizontally articulated robot performs the work.

6. A robot controlling device configured to control operation of a horizontally articulated robot configured to perform a work to a workpiece accommodated in an accommodating device, wherein the accommodating device includes a placing part on which the workpiece is placed, a wall surface, and an opening, wherein the horizontally articulated robot includes a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis, and wherein the horizontally articulated robot is disposed opposing to the opening such that a first straight line passes a vicinity of a circle centering on the first rotational axis with a radius at a difference between a distance from the first rotational axis to the second rotational axis and a distance from the second rotational axis to the third rotational axis, the first straight line being an extended line of a perpendicular from a center point of the workpiece accommodated in the accommodating device to the opening when seen in axial directions of the first to third rotational axes, the robot controlling device comprising:

a memory; and a processor configured to execute a program stored in the memory, wherein, when the program stored in the memory is executed by the processor, the robot controlling device brings the third rotational axis to be positioned on a circumference of the circle while changing a posture of the horizontally articulated robot to be holdable of the workpiece accommodated in the accommodating device, and moves the third rotational axis across a second straight line connecting the first rotational axis and the second rotational axis, and then moves each of the second rotational axis and the third rotational axis only in one of two ranges divided at a third straight line, as a boundary, connecting the center point of the workpiece accommodated in the accommodating device and the first rotational axis, wherein the robot hand is linearly moved in parallel with the first straight line while being inclined at a given angle toward the first straight line and with respect to the first straight line, over the entire path along which the posture of the horizontally articulated robot is changed from a posture in which the third rotational axis is coaxial with the first rotational axis when seen in the axial directions, to a posture holdable of the workpiece accommodated in the accommodating device, and is brought to the posture holdable of the workpiece accommodated in the accommodating device while being inclined at the given angle with respect to the first straight line, and wherein the distance between the first rotational axis and the second rotational axis is the same as the distance between the second rotational axis and the third rotational axis, and the radius of the circle is zero.

7. The robot controlling device of claim 6, wherein, when the program stored in the memory is executed by the processor, and the third rotational axis passes the circumference, or inside or the vicinity of the circle, each of the first to third rotational axes is operated based on an axial interpolation.

8. A robot system, comprising:

the robot controlling device of claim 6;

the horizontally articulated robot of which operation is controlled by the robot controlling device; and the accommodating device configured to accommodate the workpiece to which the horizontally articulated robot performs the work.

9. A robot system, comprising:
the robot controlling device of claim 1;
the horizontally articulated robot of which operation is controlled by the robot controlling device; and
the accommodating device configured to accommodate the workpiece to which the horizontally articulated robot performs the work.

10. A method of controlling a horizontally articulated robot,
wherein a placing part on which a workpiece is placed, and the horizontally articulated robot provided with a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis are prepared in advance, and
wherein the placing part and the horizontally articulated robot are disposed such that, while the robot hand holds the workpiece placed on the placing part, or while the robot hand places the workpiece on the placing part, an access straight line does not coincide with a third straight line connecting a center point of the workpiece placed on the placing part and the first rotational axis, the access straight line being a line in parallel with a direction in which the workpiece is linearly moved by the robot hand when seen in axial directions of the first to third rotational axes, and passing the center point of the workpiece placed on the placing part,
the method comprising the steps of:
bringing, during the holding operation or the placing operation, the third rotational axis to be positioned on a circumference of a circle centering on the first rotational axis with a radius at a difference between a distance from the first rotational axis to the second rotational axis and a distance from the second rotational axis to the third rotational axis, and moving the third rotational axis across a second straight line connecting the first rotational axis and the second rotational axis (First Step); and
moving, after the First Step, each of the second and third rotational axes in one of two ranges divided at the third straight line as a boundary (Second Step),
wherein in Second Step, the robot hand is linearly moved in parallel with the access straight line while being inclined at a given angle toward the access straight line and with respect to the access straight line, over the entire path along which the posture of the horizontally articulated robot is changed from a posture in which the third rotational axis is coaxial with the first rotational axis when seen in the axial directions, to a posture in which the robot hand is allowed to perform the holding operation or the placing operation, and is brought to the posture in which the robot hand is allowed to perform the holding operation or the placing operation, while being inclined at the given angle with respect to the access straight line,
wherein, during the holding operation or the placing operation, when seen in the axial directions of the first to third rotational axes, a range in which the workpiece is linearly moved by the robot hand is an overlapping range of at least a part of a range where the workpiece placed on the placing part exists and at least a part of a range where the workpiece held by the robot hand exists, and
wherein the access straight line overlaps with a path along which the center point of the workpiece is linearly moved within the moving range, when seen in the axial directions of the first to third rotational axes.

11. A method of controlling a horizontally articulated robot,
wherein a placing part on which a workpiece is placed, and the horizontally articulated robot provided with a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis are prepared in advance, and
wherein the placing part and the horizontally articulated robot are disposed such that, while the robot hand holds the workpiece placed on the placing part, or while the robot hand places the workpiece on the placing part, an access straight line does not coincide with a third straight line connecting a center point of the workpiece placed on the placing part and the first rotational axis, the access straight line being a line in parallel with a direction in which the workpiece is linearly moved by the robot hand when seen in axial directions of the first to third rotational axes, and passing the center point of the workpiece placed on the placing part,
the method comprising the steps of:
bringing, during the holding operation or the placing operation, the third rotational axis to be positioned on a circumference of a circle centering on the first rotational axis with a radius at a difference between a distance from the first rotational axis to the second rotational axis and a distance from the second rotational axis to the third rotational axis, and moving the third rotational axis across a second straight line connecting the first rotational axis and the second rotational axis (First Step); and
moving, after the First Step, each of the second and third rotational axes in one of two ranges divided at the third straight line as a boundary (Second Step),
wherein in Second Step, the robot hand is linearly moved in parallel with the access straight line while being inclined at a given angle toward the access straight line and with respect to the access straight line, over the entire path along which the posture of the horizontally articulated robot is changed from a posture in which the third rotational axis is coaxial with the first rotational axis when seen in the axial directions, to a posture in which the robot hand is allowed to perform the holding operation or the placing operation, and is brought to the posture in which the robot hand is allowed to perform the holding operation or the placing operation, while being inclined at the given angle with respect to the access straight line,
wherein the placing part is a part of an accommodating device configured to accommodate the workpiece, the accommodating device including a wall surface and an opening, and wherein the access straight line vertically intersects with at least a part of the opening when seen in the axial directions of the first to third rotational axes.

12. A method of controlling a horizontally articulated robot,
wherein a placing part on which a workpiece is placed, and the horizontally articulated robot provided with a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis are prepared in advance, and
wherein the placing part and the horizontally articulated robot are disposed such that, while the robot hand holds the workpiece placed on the placing part, or while the robot hand places the workpiece on the placing part, an access straight line does not coincide with a third straight line connecting a center point of the workpiece placed on the placing part and the first rotational axis, the access straight line being a line in parallel with a direction in which the workpiece is linearly moved by the robot hand when seen in axial directions of the first to third rotational axes, and passing the center point of the workpiece placed on the placing part,
the method comprising the steps of:
bringing, during the holding operation or the placing operation, the third rotational axis to be positioned on a circumference of a circle centering on the first rotational axis with a radius at a difference between a distance from the first rotational axis to the second rotational axis and a distance from the second rotational axis to the third rotational axis, and moving the third rotational axis across a second straight line connecting the first rotational axis and the second rotational axis (First Step); and
moving, after the First Step, each of the second and third rotational axes in one of two ranges divided at the third straight line as a boundary (Second Step),
wherein in Second Step, the robot hand is linearly moved in parallel with the access straight line while being inclined at a given angle toward the access straight line and with respect to the access straight line, over the entire path along which the posture of the horizontally articulated robot is changed from a posture in which the third rotational axis is coaxial with the first rotational axis when seen in the axial directions, to a posture in which the robot hand is allowed to perform the holding operation or the placing operation, and is brought to the posture in which the robot hand is allowed to perform the holding operation or the placing operation, while being inclined at the given angle with respect to the access straight line,
wherein the placing part is a part of an accommodating device configured to accommodate the workpiece, the accommodating device including a wall surface and an opening, and
wherein the access straight line is in parallel with at least a part of the wall surface when seen in the axial directions of the first to third rotational axes.

13. A robot system, comprising:
a robot controlling device configured to control operation of a horizontally articulated robot configured to perform a work to a workpiece accommodated in an accommodating device,
wherein the accommodating device includes a placing part on which the workpiece is placed, a wall surface, and an opening,
wherein the horizontally articulated robot includes a first rotational axis, a first link attached at a base-end part to the first rotational axis so as to be rotatable about the first rotational axis, a second rotational axis provided to a tip-end part of the first link, a second link attached at a base-end part to the second rotational axis so as to be rotatable about the second rotational axis, a third rotational axis provided to a tip-end part of the second link, and a robot hand attached at a base-end part to the third rotational axis so as to be rotatable about the third rotational axis, and
wherein the horizontally articulated robot is disposed opposing to the opening such that, while the robot hand takes out the workpiece accommodated in the accommodating device, or while the robot hand accommodates the workpiece into the accommodating device, an access straight line passes a vicinity of a circle centering on the first rotational axis with a radius at a difference between a distance from the first rotational axis to the second rotational axis and a distance from the second rotational axis to the third rotational axis, the access straight line being a line in parallel with a direction in which the workpiece is linearly moved by the robot hand without being contacted to the wall surface when seen in axial directions of the first to third rotational axes, and passing a center point of the workpiece accommodated in the accommodating device,
the robot controlling device comprising:
a memory; and
a processor configured to execute a program stored in the memory,
wherein when the program stored in the memory is executed by the processor, the robot controlling device brings the third rotational axis to be positioned on a circumference of the circle while changing a posture of the horizontally articulated robot to be holdable of the workpiece accommodated in the accommodating device, and moves the third rotational axis across a second straight line connecting the first rotational axis and the second rotational axis, and then moves each of the second rotational axis and the third rotational axis only in one of two ranges divided at a third straight line, as a boundary, connecting the center point of the workpiece accommodated in the accommodating device and the first rotational axis, and
wherein the robot hand is linearly moved in parallel with the access straight line while being inclined at a given angle toward the access straight line and with respect to the access straight line, over the entire path along which the posture of the horizontally articulated robot is changed from a posture in which the third rotational axis is coaxial with the first rotational axis when seen in the axial directions, to a posture holdable of the workpiece accommodated in the accommodating device, and is brought to the posture holdable of the workpiece accommodated in the accommodating device while being inclined at the given angle with respect to the access straight line, the horizontally articulated robot of which operation is controlled by the robot controlling device; and the accommodating device configured to accommodate the workpiece to which the horizontally articulated robot performs the work.

14. The robot system of claim 13, wherein, when the program stored in the memory is executed by the processor, and the third rotational axis passes the circumference, or inside or the vicinity of the circle, each of the first to third rotational axes is operated based on an axial interpolation.

* * * * *